(12) United States Patent
Pahlevaninezhad et al.

(10) Patent No.: US 8,644,035 B2
(45) Date of Patent: Feb. 4, 2014

(54) LOAD ADAPTIVE VARIABLE FREQUENCY PHASE-SHIFT FULL-BRIDGE DC/DC CONVERTER

(76) Inventors: Majid Pahlevaninezhad, Kingston (CA); Praveen Jain, Kingston (CA)

(\*) Notice: Subject to any disclaimer, the term of this patent is extended or adjusted under 35 U.S.C. 154(b) by 76 days.

(21) Appl. No.: 13/404,167

(22) Filed: Feb. 24, 2012

(65) Prior Publication Data

US 2013/0223103 A1    Aug. 29, 2013

(51) Int. Cl.
    *H02M 3/335*    (2006.01)
(52) U.S. Cl.
    USPC .............................................. 363/17; 363/98
(58) Field of Classification Search
    USPC ................... 363/15–17, 21.06, 21.14, 98
    See application file for complete search history.

(56) References Cited

U.S. PATENT DOCUMENTS

| | | | |
|---|---|---|---|
| 7,136,294 B2 \* | 11/2006 | Phadke et al. | 363/132 |
| 2008/0207136 A1 | 8/2008 | Tang et al. | |
| 2008/0247194 A1 \* | 10/2008 | Ying et al. | 363/17 |
| 2009/0300690 A1 | 12/2009 | Xu et al. | |

\* cited by examiner

*Primary Examiner* — Gary L Laxton
*Assistant Examiner* — Kyle J Moody
(74) *Attorney, Agent, or Firm* — Brion Raffoul

(57) ABSTRACT

Systems, methods, and circuits for providing zero voltage switching conditions across all load conditions in a full-bridge DC/DC converter. An asymmetric auxiliary circuit is provided and the reactive current due to the auxiliary circuit is controlled across various load conditions. This is done by adaptively adjusting the switching frequency of the converter as well as the phase shift of the rising edges of the waveforms for activating the gates in the leading and lagging legs of the full bridge converter.

11 Claims, 25 Drawing Sheets

Constant Current Mode

Constant Power Mode

Constant Voltage Mode

LOAD ADAPTIVE VARIABLE FREQUENCY PHASE-SHIFT FULL-BRIDGE DC/DC CONVERTER

TECHNICAL FIELD

The present invention relates to power converters. More specifically, the present invention relates to methods, circuits, and devices related to a DC/DC converter which uses a variable switching frequency and phase shift to ensure zero voltage switching conditions for its MOSFETs.

BACKGROUND OF THE INVENTION

The drive for environmentally friendly vehicles has led to multiple innovations in the recent past. One of the major areas of research which has led to the viability of electric vehicles is in power systems and, more specifically, in the power systems used to charge the batteries in these electric or sometimes hybrid vehicles. Such power systems generally include DC/DC converters which convert DC power from one voltage into another, more useful, voltage.

Full-bridge topology is the most popular topology used in the power range of a few kilowatts (1-5 KW) for DC/DC converters. Since the switch ratings are optimized for the full-bridge topology, this topology is extensively used in industrial applications. High efficiency, high power density and high reliability are the prominent features of this topology.

In the range of a few kilowatts, MOSFETs (Metal Oxide Semiconductor Field Effect Transistors) are mostly used to implement the full-bridge converters. In order to have robust and reliable operation, MOSFETs should be switched under zero voltage. Operating at Zero Voltage Switching (ZVS) decreases the converter switching losses and provides a noise free environment for the control circuit. Zero voltage switching is usually achieved by providing an inductive current flowing out of the full-bridge legs during the switch turn-on and by placing a snubber capacitor across each switch during the switch turn-off. In a practical full-bridge configuration, the internal drain-to-source capacitance of the MOSFET is utilized as the snubber capacitor, the series inductor is usually the leakage inductance of the power transformer, and the parallel inductor is implemented by using the magnetizing inductance of the power transformer. Thus, external passive components are not required and this makes the power circuit very simple and efficient. However, the full-bridge converter with the series inductor loses its ZVS capability at light loads, and the converter with the parallel inductor loses its ZVS under heavy loads. Loss of ZVS means extremely high switching losses at high switching frequencies and very high EMI due to the high di/dt of the snubber discharge current. Loss of ZVS can also cause a very noisy control circuit, which leads to shoot-through and loss of the semiconductor switches. The ZVS range can be extended by increasing the series inductance. However, having a large series inductance limits the power transfer capability of the converter and reduces the effective duty ratio of the converter.

In battery charger applications, ZVS is important since the converter might be operating at no-load for a long period of time. As an example, when the battery is charged, the load is zero and the converter should be able to safely operate under the zero load condition. Since ZVS in conventional full-bridge PWM converters is achieved by utilizing the energy stored in the leakage inductance to discharge the output capacitance of the MOSFETs, the range of the ZVS operation is highly dependent on the load and on the transformer leakage inductance. Thus, conventional full-bridge converters are not able to ensure ZVS operation at light loads.

Resonant topologies can provide soft-switching. However, in order to guarantee ZVS in resonant converters, a high value of reactive current circulation is required especially for a wide range of load variations. This leads to a bulky resonant tank, lower power density, and lower efficiency.

Auxiliary commutated ZVS full bridge converter topologies suitable for low power applications have been reported in the literature. In these converters, an auxiliary circuit is used to produce the reactive current for the full-bridge switches. The auxiliary circuit is working independent of the system operating conditions and is able to guarantee zero voltage switching from no-load to full-load. Although this topology seems very suitable for the battery charger application, there are some setbacks related to the auxiliary circuit. Since the auxiliary circuit should provide enough reactive power to guarantee ZVS at all operating conditions, the peak value of the current flowing through the auxiliary inductor is very high, thereby drastically increasing the MOSFET conduction losses. Also, due to the fact that the voltage and frequency across the auxiliary inductor is very high, the core losses of this inductor are also high. In addition, too much reactive current leads to large voltage spikes on the semiconductor switches due to the delay in the body diode turn-on.

There is therefore a need for methods, circuits, and devices which can mitigate if not overcome the shortcomings of the prior art. From the above, the lowering if not the elimination of the voltage spikes while providing for ZVS conditions would be desirable.

SUMMARY OF INVENTION

The present invention provides systems, methods, and circuits for providing zero voltage switching conditions across all load conditions in a full-bridge DC/DC converter. An asymmetric auxiliary circuit is provided and the reactive current due to the auxiliary circuit is controlled across various load conditions. This is done by adaptively adjusting the switching frequency of the converter as well as the phase shift of the rising edges of the waveforms for activating the gates in the leading and lagging legs of the full bridge converter.

In a first aspect, the present invention provides a DC-to-DC full bridge converter circuit comprising:
  a leading leg comprising:
    a first transistor;
    a second transistor;
  a lagging leg comprising:
    a third transistor;
    a fourth transistor;
  a first auxiliary circuit comprising:
    a first capacitor coupled between a first node and a second node;
    a second capacitor coupled between said second node and a third node;
    a first auxiliary inductor coupled between said second node and a fourth node;
  a second auxiliary circuit comprising:
    a third capacitor coupled between said first node and a fifth node;
    a fourth capacitor coupled between said third node and said fifth node;
    a second auxiliary inductor coupled between said fifth node and a sixth node;
wherein
  said first node is coupled to a drain of said first transistor and a drain of said third transistor;

said third node is coupled to a source of said second transistor and a source of said fourth transistor;

said fourth node is coupled to a source of said first transistor and a drain of said second transistor;

said sixth node is coupled to a source of said third transistor and a drain of said fourth transistor.

In a second aspect, the present invention provides a method for controlling a full bridge DC-to-DC converter, the method comprising:

a) determining a current difference between a reference current for said converter and an output current for said converter;

b) determining a phase shift between switching pulses for a transistor in a leading leg of said converter and for a transistor in a lagging leg of said converter based on said current difference;

c) determining a load on said converter;

d) determining a switching frequency for said converter based on said load;

e) adjusting and modulating a switching of –MOSFETs of said converter based on said phase shift and said switching frequency.

BRIEF DESCRIPTION OF THE DRAWINGS

The embodiments of the present invention will now be described by reference to the following figures, in which identical reference numerals in different figures indicate identical elements and in which:

FIG. 12($b$) shows the experimental results of the fixed-frequency phase-shift converter for full-load conditions;

DETAILED DESCRIPTION OF THE INVENTION

In one aspect, the invention presents a control method that optimizes the required reactive current provided by the auxiliary circuit. In another aspect, the invention provides a control circuit that adaptively controls the reactive current required to guarantee ZVS under different load conditions. This leads to significantly reduced semiconductor conduction losses as well as reduced auxiliary circuit losses.

Figure 1:
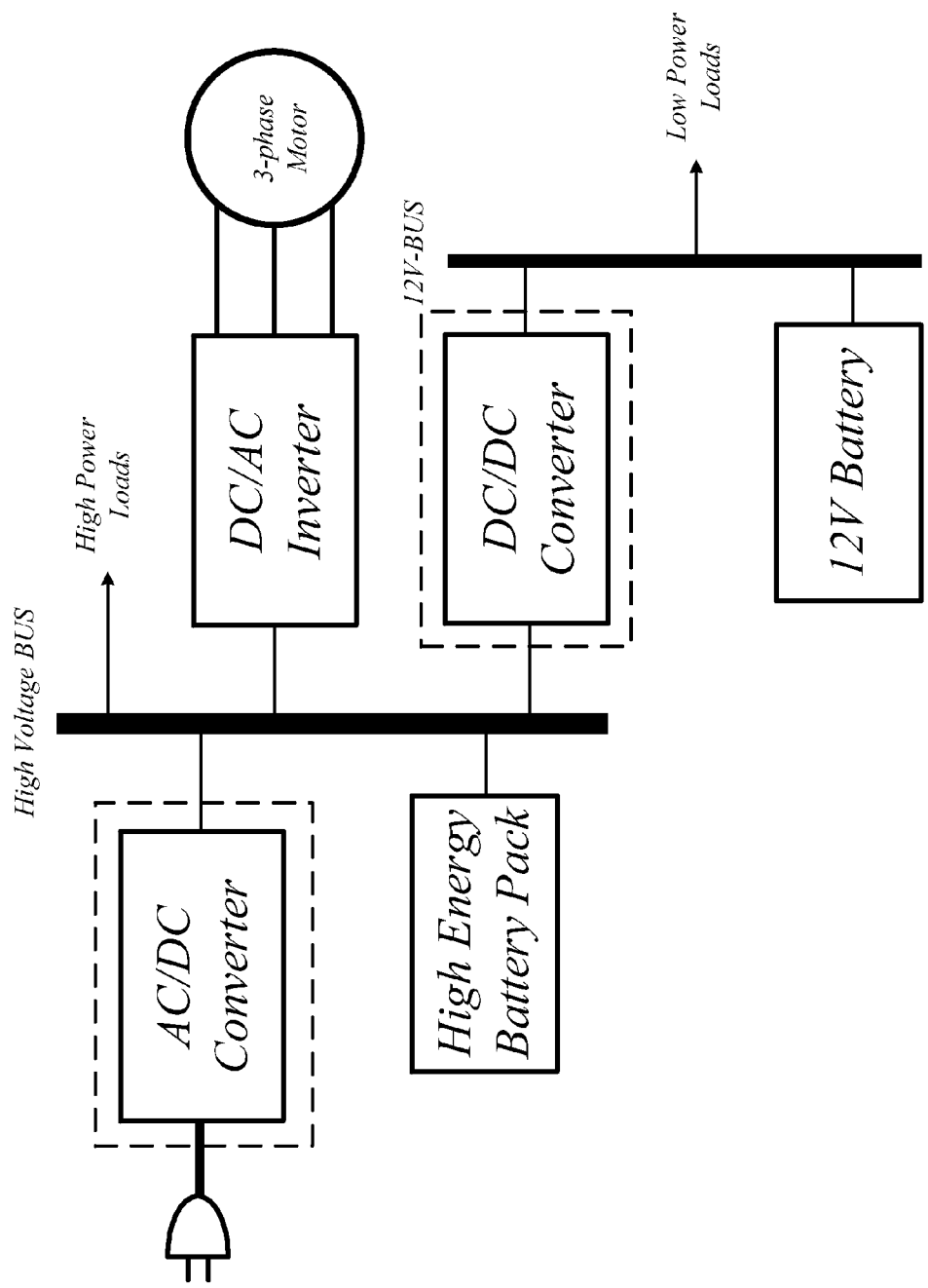
FIG. 1 is a block diagram of an electric vehicle power conversion system.

FIG. 1 is a block diagram of an electric vehicle power conversion system. In this system there are two battery units: a high voltage battery (traction n battery), which feeds the inverter and the electric motor, and a 12V battery. The power conversion system consists of an AC/DC converter, a three-phase DC/AC inverter and a DC/DC converter. The AC/DC converter is a plug-in converter, which charges the high voltage battery. The high voltage battery supplies power to the three-phase inverter which feeds the 3-phase motor. The high voltage battery also charges the 12V battery through a DC/DC converter. In one aspect, the present invention is concerned with the DC/DC converter which is used to charge the 12V battery in FIG. 1.

Figure 2:
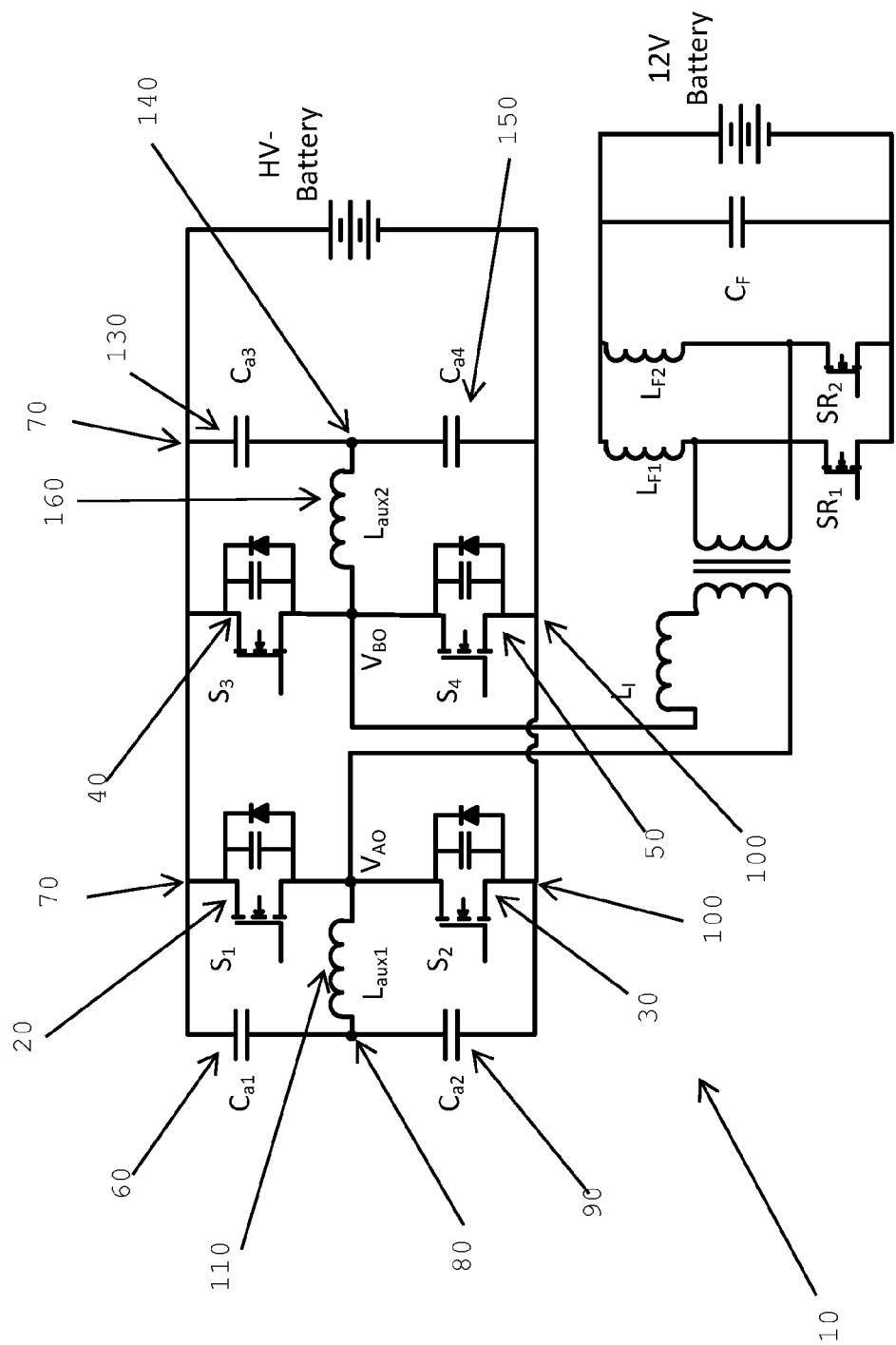
FIG. 2 is a diagram of a power circuit of a full bridge dc-to-dc converter incorporating one aspect of the invention.

FIG. 2 shows the power circuit of the full-bridge converter with an asymmetric auxiliary circuit. Referring to FIG. 2, a full-bridge DC-to-DC converter circuit 10 is illustrated. The circuit 10 has four –MOSFETs 20, 30, 40, 50. The first MOSFET 20 and the second –MOSFET 30 form the leading leg of the circuit 10 while the third –MOSFET 40 and the fourth –MOSFET 50 form the lagging leg of the circuit 10. As can be seen, each of the –MOSFETs 20, 30, 40, 50 has a snubber capacitor and a diode associated with it. Each leg has an auxiliary circuit coupled between the –MOSFETs for that leg.

For the leading leg of the circuit 10, a first capacitor 60 is coupled between a first node 70 and a second node 80. A second capacitor 90 is coupled between the second node 80 and a third node 100. A first auxiliary inductor 110 is coupled between the second node 80 and a fourth node 120 (adjacent label $V_{AO}$ in the diagram). The fourth node 120 is also coupled to the source lead of the first MOSFET 20 and the drain lead of the second MOSFET 30. The source lead for the second MOSFET 30 is coupled to the third node 100 while the drain lead for the first MOSFET 20 is coupled to the first node 70.

For the lagging leg, a similar auxiliary circuit is shown in FIG. 2. For the lagging leg, a third capacitor 130 is coupled between the first node 70 and a fifth node 140. A fourth capacitor 150 is coupled between the fifth node 140 and the third node 100. A second auxiliary inductor 160 is coupled between a sixth node 170 (adjacent label $V_{BO}$ in the diagram) and the fifth node 140. The sixth node 170 is also coupled to the source lead of the third MOSFET 40 and the drain lead of the fourth MOSFET 50. The source lead for the fourth MOSFET 50 is coupled to the third node 100 while the drain lead of the third MOSFET 40 is coupled to the first node 70.

Figure 3:
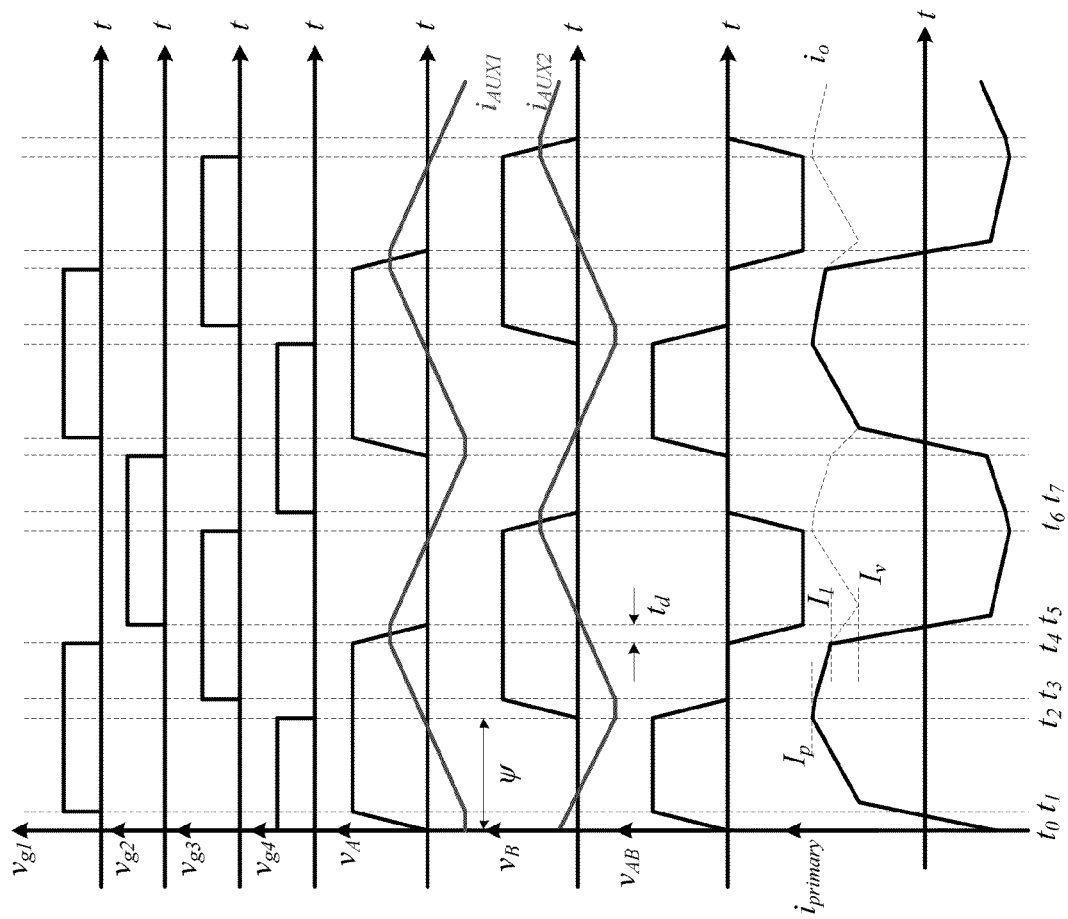
FIG. 3 illustrates the gate pulses for the MOSFETs along with other waveforms of the converter in FIG. 2.
Figure 4:
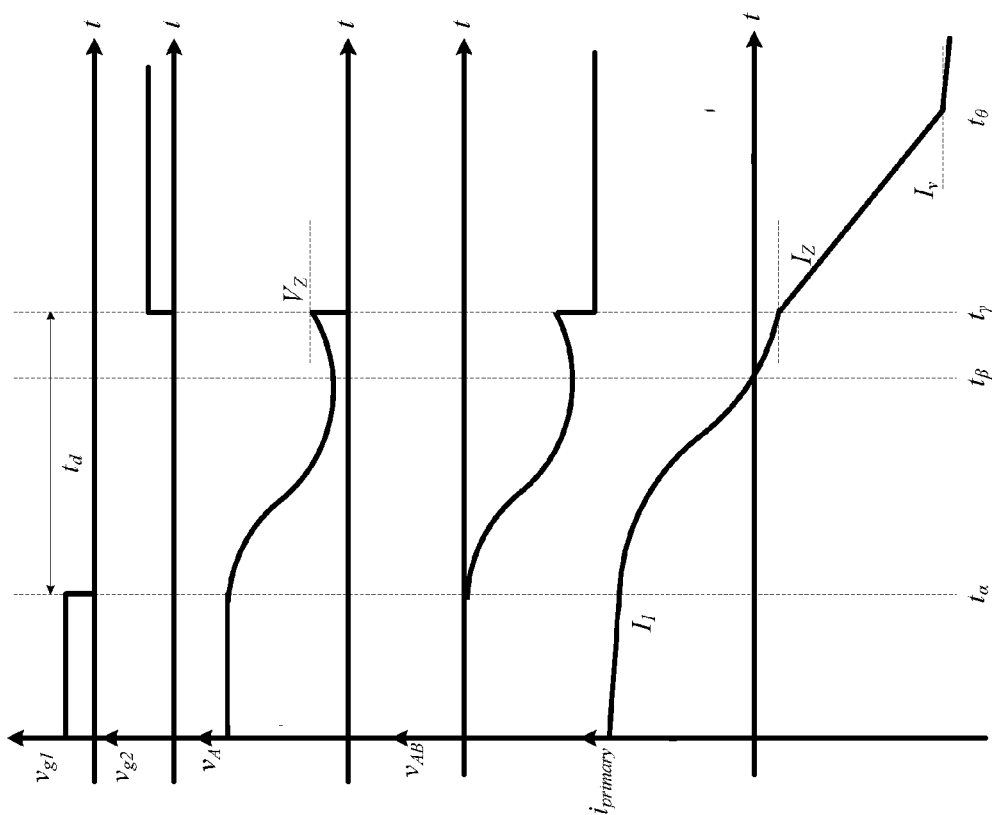
FIG. 4 illustrates the switching transition for the leading leg of the converter in FIG. 2.
Figure 5:
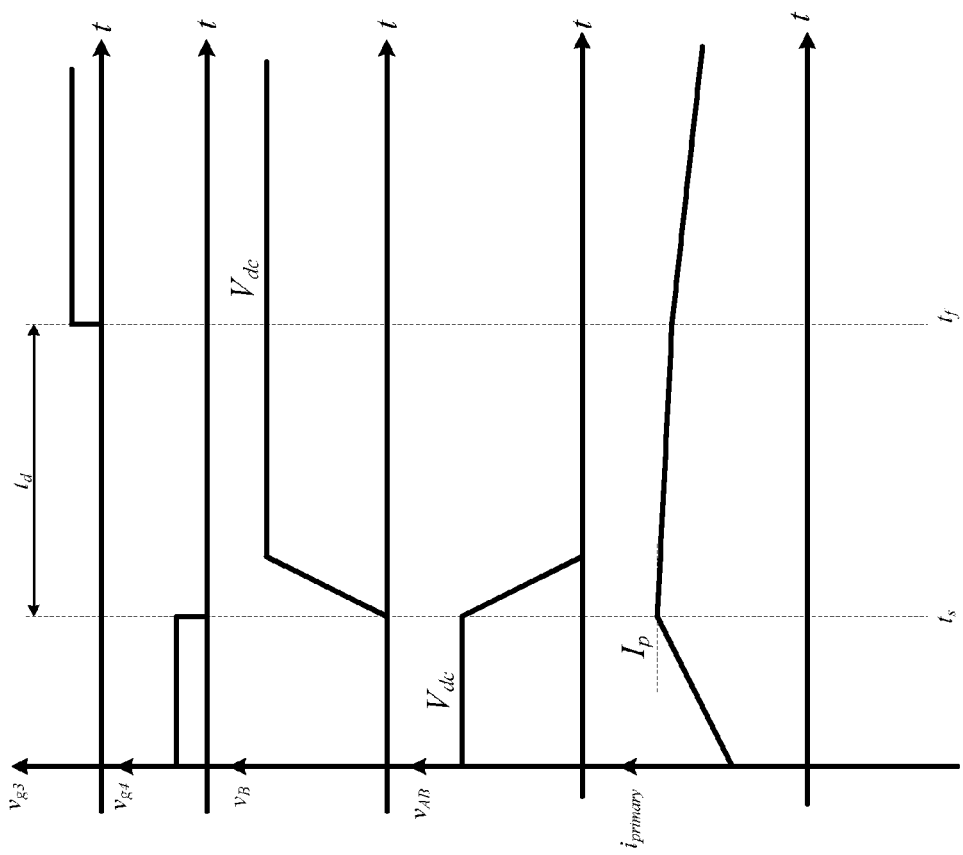
FIG. 5 illustrates the switching transition for the lagging leg of the converter in FIG. 2.

The key waveforms of the converter are shown in FIG. 3. FIG. 3 shows the gate pulses of the MOSFETs in FIG. 2. According to the gate signals, $S_1$ and $S_2$ represent the MOSFETs of the leading leg of the converter and $S_3$ and $S_4$ represent the MOSFETs of the lagging leg of the converter. The behavior of the leading leg and the behavior of the lagging leg are significantly different during the switching MOSFETs. The switching transition for the leading leg of the converter is shown in FIG. 4. During this time $S_1$ is turned off and $S_2$ is turned on. According to this figure, the current through the leakage inductance crosses zero at $t=t_\beta$. This means that the snubber capacitor across $S_2$ is charging instead of being discharged by the leakage inductance current. If the value of the current at $t_\alpha$ is high enough to discharge the snubber capacitor across $S_2$ to zero before $t_\beta$, zero voltage switching is guaranteed. However, this only happens at heavy loads especially if the leakage inductance is very low. According to FIG. 4, in order to provide the ZVS condition for the leading leg, the auxiliary circuit not only should provide enough current to discharge the snubber capacitor, but it should also neutralize the negative current of the leakage inductance. For the lagging leg, the auxiliary circuit should provide enough current to discharge the snubber capacitor, as shown in FIG. 5. This is because, for the lagging leg, the current never becomes a negative value. Thus, the amount of inductive current required to guarantee ZVS is completely different for the leading leg and the lagging leg.

Figure 6:
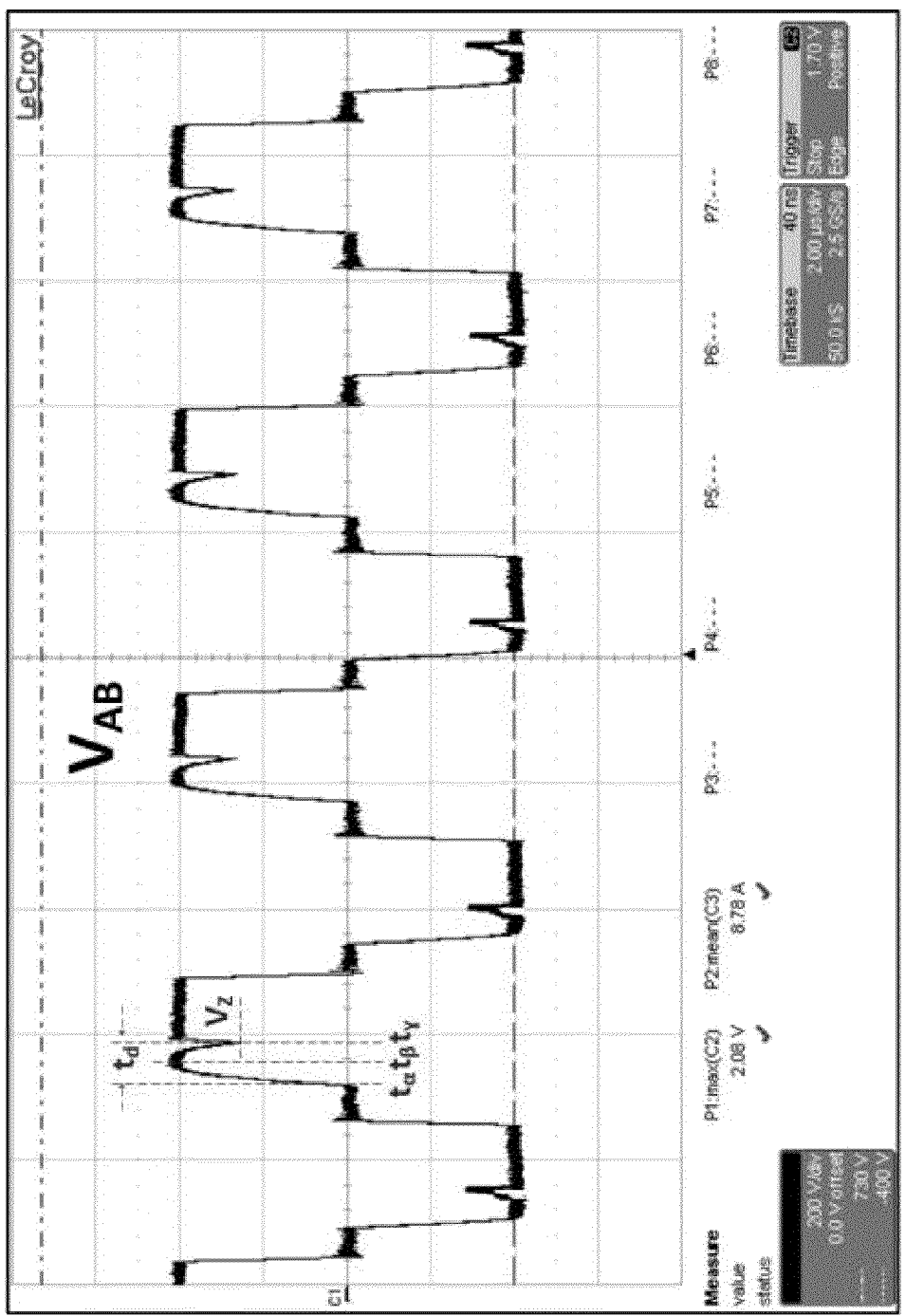
FIG. 6 illustrates the experimental results for the full bridge inverter voltage for a conventional phase-shift converter.

FIG. 6 shows the experimental result of the inverter output voltage when there is no auxiliary circuit. According to this figure, the current, which flows out of the leading leg, goes to negative values and then the voltage charges the snubber capacitor in the reverse direction. This leads to a non-zero voltage when the leading leg MOSFETs are turned on.

Calculating $t_\beta$, $t_\gamma$ and $t_\theta$ is important in order to determine how much current is required to guarantee ZVS for the leading leg. In order to calculate $t_\beta$, $t_\gamma$ and $t_\theta$, the mathematical equation for the leakage current and the voltage across the snubber capacitor should be derived. According to FIG. 4, at $t_\alpha$, $S_1$ is turned off. At this point the energy stored in the leakage inductance is released to the MOSFET capacitors.

In order to analyze the behavior of the converter during switching transitions, the effects of the auxiliary circuits are ignored at the beginning. Then later, the effects of the auxiliary circuits are incorporated into the analysis.

The differential equations of the system are given by Equation 1:

$$\frac{d\, i_{Leak}(t - t_\alpha)}{dt} = -\frac{R_{series}}{L_{leak}} \cdot i_{Leak}(t - t_\alpha) - \frac{v_{S1}(t - t_\alpha)}{L_{leak}}$$

$$\frac{d\, v_{S1}(t - t_\alpha)}{dt} = \frac{i_{Leak}(t - t_\alpha)}{2 C_{S1}}$$

$$i_{Leak}(t_\alpha) = I_1$$

$$v_{S1}(t_\alpha) = V_{dc}$$

The transformer current and the voltage across $S_1$ are given by the following equations for $t_\alpha < t < t_\gamma$ (Equations 2 and 3):

$$i_{Leak}(t) = \left(\frac{I_1 \cdot \xi}{\omega_z} - \frac{kVo}{(L_{leak} + k^2 \cdot L_f) \cdot \omega_z}\right) \cdot e^{-\xi(t-t_\alpha)} \cdot \sin[\omega_z \cdot (t - t_\alpha)] + I_1 \cdot e^{-\xi(t-t_\alpha)} \cdot \cos[\omega_z \cdot (t - t_\alpha)]$$

$$v_{S1}(t) = V_{dc} \cdot e^{-\xi(t-t_\alpha)} \cos[\omega_z \cdot (t-t_\alpha)] - \left(\frac{V_{dc} \cdot \xi}{\omega_z} + \frac{I_1}{2C_{s1} \cdot \omega_z}\right) \cdot e^{-\xi(t-t_\alpha)} \cdot \sin[\omega_z \cdot (t - t_\alpha)]$$

where $I_1$ is the current value at $t=t_\alpha$, k is the transformer turns ratio, $\omega_z$ is the resonant frequency of the leakage inductance and the snubber capacitances, and $\xi$ is the damping ratio given by Equations 4 and 5:

$$\omega_z = \frac{1}{\sqrt{2 C_{s1} \cdot L_{leak}}} \quad (4)$$

$$\xi = \frac{R_{series}}{2 L_{leak}} \quad (5)$$

where $R_{series}$ is the equivalent resistance in series with the leakage inductance.

$t_\beta$ is the time that the current through the leakage inductance crosses zero. Therefore, by inserting into Equation 2, the value of $t_\beta$ is given by Equation 6:

$$t_\beta = \frac{1}{\omega_z}\left[\frac{\pi}{2} - \tan^{-1}\left(\frac{I_1}{\frac{I_1 \cdot \xi}{\omega_z} - \frac{kVo}{(L_{leak} + L_f) \cdot \omega_z}}\right)\right] \quad (6)$$

The capacitor across the MOSFET must be discharged completely during the dead-time in order to have zero voltage switching. If $I_1$ is large enough to discharge the capacitor and bring $V_{S1}$ to zero during the dead-time, the voltage will be clamped by the body diode of the MOSFET and the resonant voltage will be zero. However, this condition only happens at heavy loads with enough dead-time. The worst case is that either the current is not enough to discharge the capacitor completely or that the dead-time is too short to allow the voltage to reach zero. In this scenario, the resonant voltage will not be clamped by the body diodes and the resonant voltage will continue to resonate with the leakage inductance.

According to FIG. 4, $t_\gamma$ is the time at which $S_2$ is turned on. This represents the dead-time between $S_1$ and $S_2$. If there is enough current to bring $V_Z$ to zero before the dead-time, the voltage across the switch remains zero or $V_Z = v_{S1}(t_\gamma) = 0$. Otherwise, the values of the voltage and the current at $t_\gamma$ are calculated by inserting $t_d$ into Equation 2 and Equation 3 to result in Equations 7 and 8:

$$V_Z = v_{S1}(t_\gamma)$$
$$= V_{dc} \cdot e^{-\xi \cdot t_d} \cos(\omega_z \cdot t_d) - \left(\frac{V_{dc} \cdot \xi}{\omega_z} + \frac{I_1}{2C_{s1} \cdot \omega_z}\right) \cdot e^{-\xi \cdot t_d} \sin(\omega_z \cdot t_d)$$

$$I_Z = i_{Leak}(t_\gamma)$$
$$= \left(\frac{I_1 \cdot \xi}{\omega_z} - \frac{kVo}{(L_{leak} + L_f) \cdot \omega_z}\right) \cdot e^{-\xi \cdot t_d} \cdot \sin(\omega_z \cdot t_d) + I_1 \cdot e^{-\xi \cdot t_d} \cdot \cos(\omega_z \cdot t_d)$$

Switch $S_2$ is turned on at $t_\gamma$ and the voltage across the leakage inductance is $-V_{dc}$ until the primary current reaches the reflected load current. Thus, between $t_\gamma$ and $t_\theta$ the output diodes are freewheeling, with the output current and the large negative voltage across the leakage inductance forcing the primary current to reach the reflected output current at $t_\theta$. The value of $t_\theta$ depends on the value of the leakage inductance and the load current. For heavy loads, $t_\theta$ is larger and for light loads $t_\theta$ is smaller. The transformer primary current for $t_\gamma < t < t_\theta$ is given by Equation 9:

$$i_{Leak}(t-t_y) = I_Z - \frac{V_{dc}}{L_{leak}}(t-t_y) \quad (9)$$

where $I_Z$ is given by Equation 8.

The value for $t_\theta$ is given using Equation 9 as follows (Equation 10):

$$t_\theta = \frac{(I_Z - I_V) \cdot L_{leak}}{V_{dc}} \quad (10)$$

Equations 2, 3 and 9 thoroughly describe the behavior of the leading leg during the switching transition. The value of the currents, $I_p$, $I_v$, and $I_1$ are derived from the steady-state analysis as (Equations 11, 12, and 13):

$$I_p = I_o + \frac{(V_{dc} - kV_o) \cdot V_o}{4L_f \cdot V_{dc} \cdot f_s} \quad (11)$$

$$I_v = I_o - \frac{(V_{dc} - kV_o) \cdot V_o}{4L_f \cdot V_{dc} \cdot f_s} \quad (12)$$

$$I_1 = I_p - \frac{\psi \cdot k \cdot V_o}{2\pi \cdot L_f \cdot f_s} \quad (13)$$

where $\psi$ is the phase-shift between the rising edge of $v_{g1}$ and the rising edge of $v_{g3}$.

In order to satisfy the ZVS criterion, the value of the voltage at $t_\gamma$, $V_Z$, must be zero. Thus, the inductive current from the auxiliary circuit should be enough to ensure that the voltage is zero at $t_\gamma$. Due to the fact that the auxiliary circuit current remains mostly constant during the dead time, the auxiliary inductor acts as a constant current source, which discharges the capacitor across $S_1$ and charges the capacitor across $S_2$. The value of this constant current source is derived as (Equation 14):

$$I_{AUX} = \frac{V_{dc}}{8f_s \cdot L_{AUX}} \quad (14)$$

Therefore, the MOSFET capacitor voltage due to this constant current source is derived as (Equation 15):

$$v_{S1,aux}(t) = V_{dc} - \frac{V_{dc}}{8f_s \cdot L_{AUX}} \cdot (t - t_\alpha) \quad (15)$$

The inductor value is designed so as to provide enough current to make $V_Z$ zero; hence the inductor is designed as (Equation 16):

$$L_{AUX1} = \frac{V_{dc} \cdot t_d}{16 f_s \cdot C_{s1} \cdot (V_{dc} + V_Z)} \quad (16)$$

In order to design the auxiliary inductor for the lagging leg, the energy which is required to discharge the snubber capacitor should be calculated. In this case, the primary current never becomes a negative value, and in the worst case it can be zero. The energy required to discharge and charge the snubber capacitors is given by (Equation 17):

$$W_{Cs} = C_{s2} \cdot V_{dc}^2 \quad (17)$$

The energy stored in the leakage and the auxiliary inductances as well as the peak current of the auxiliary inductor are given by Equations 18 and 19:

$$W_L = \frac{1}{2} \cdot L_{leak} \cdot I_p^2 + \frac{1}{2} \cdot L_{AUX2} \cdot I_{AUX2}^2 \quad (18)$$

$$I_{AUX} = \frac{V_{dc}}{8 f_s \cdot L_{AUX}} \quad (19)$$

In the worst case $I_p$ is equal to zero. Therefore, the lagging leg auxiliary inductance is derived as (Equation 20):

$$L_{AUX2} = \frac{1}{128 f_s^2 \cdot C_{s2}} \quad (20)$$

Figure 7:
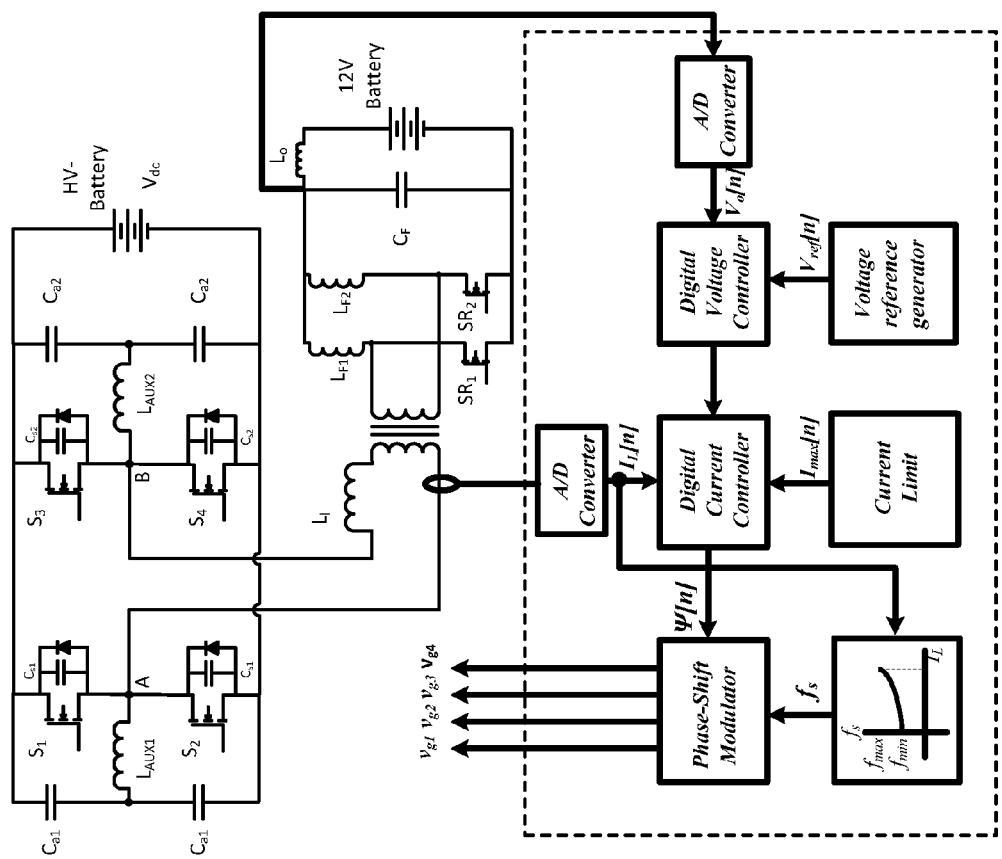
FIG. 7 is a block diagram for a control system according to one aspect of the invention.
Figure 8:
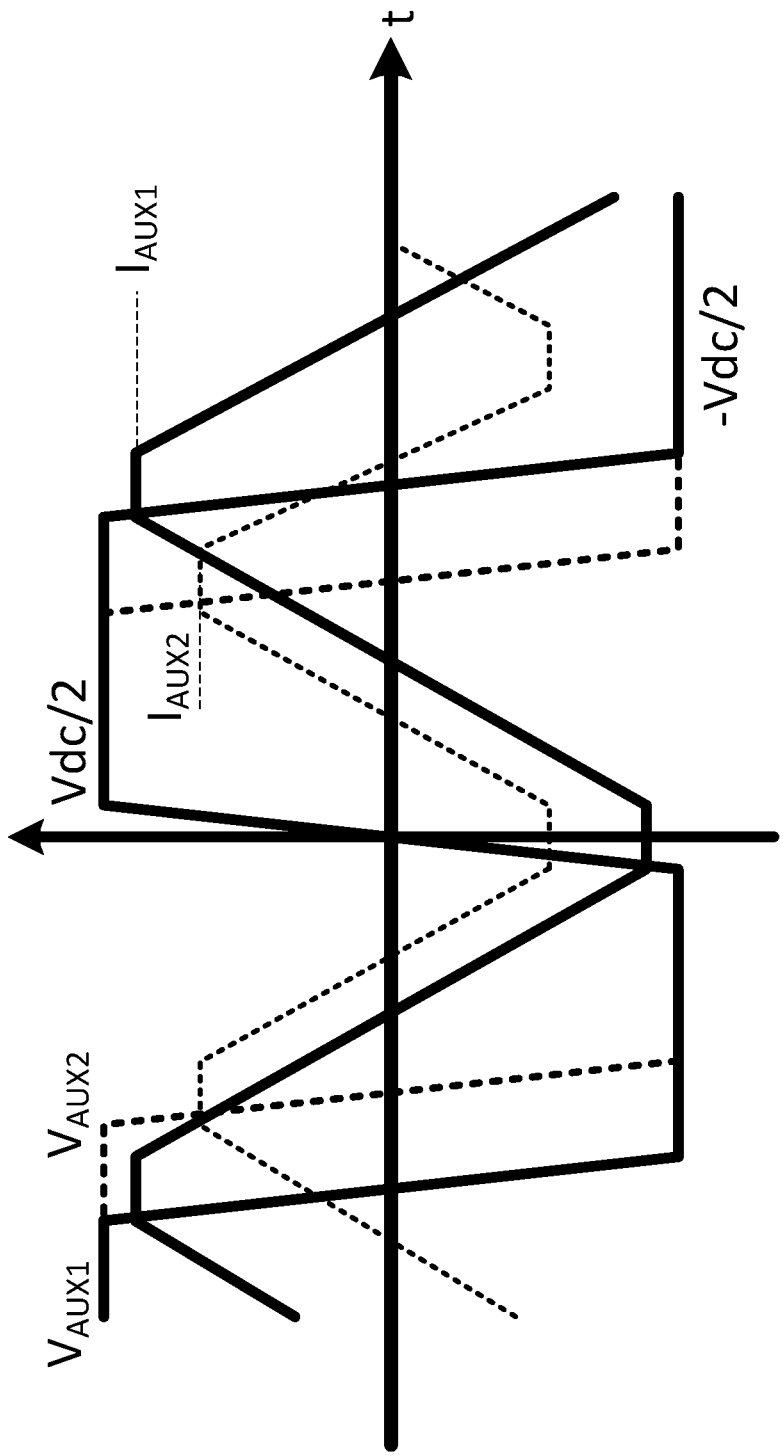
FIG. 8 shows the various waveforms for the auxiliary circuit according to one aspect of the invention.

FIG. 7 shows the block diagram of one aspect of the invention. The control system which forms one aspect of the invention has an internal current loop and an external voltage loop. There is another loop which regulates the frequency for the modulator depending upon the load conditions. This control system is able to minimize the converter losses in that the peak value of the reactive current through the auxiliary circuit is controlled by the switching frequency. At light loads, the switching frequency is lower to provide enough inductive current to ensure ZVS and at higher loads the switching frequency is higher to avoid too much reactive current and to reduce the semiconductor conduction losses. FIG. 8 illustrates how the frequency loop works. At light loads the frequency is lower. Therefore, the voltage across the auxiliary inductor remains for a longer time and the inductive current at the start of the switching transition is a larger value. For heavy loads the frequency is higher, which decreases the peak value of the inductive current. The frequency control block is modeled by (Equation 21):

$$f_s = \frac{V_{dc} \cdot t_d}{16 L_{AUX1} \cdot C_{s1} \cdot \left[ V_{dc} + V_{dc} \cdot e^{-\xi \cdot t_d} \cos(\omega_z \cdot t_d) - \left( \frac{V_{dc} \cdot \xi}{\omega_z} + \frac{I_1}{2C_{s1} \cdot \omega_z} \right) \cdot e^{-\xi \cdot t_d} \sin(\omega_z \cdot t_d) \right]} \quad (21)$$

Figure 9:
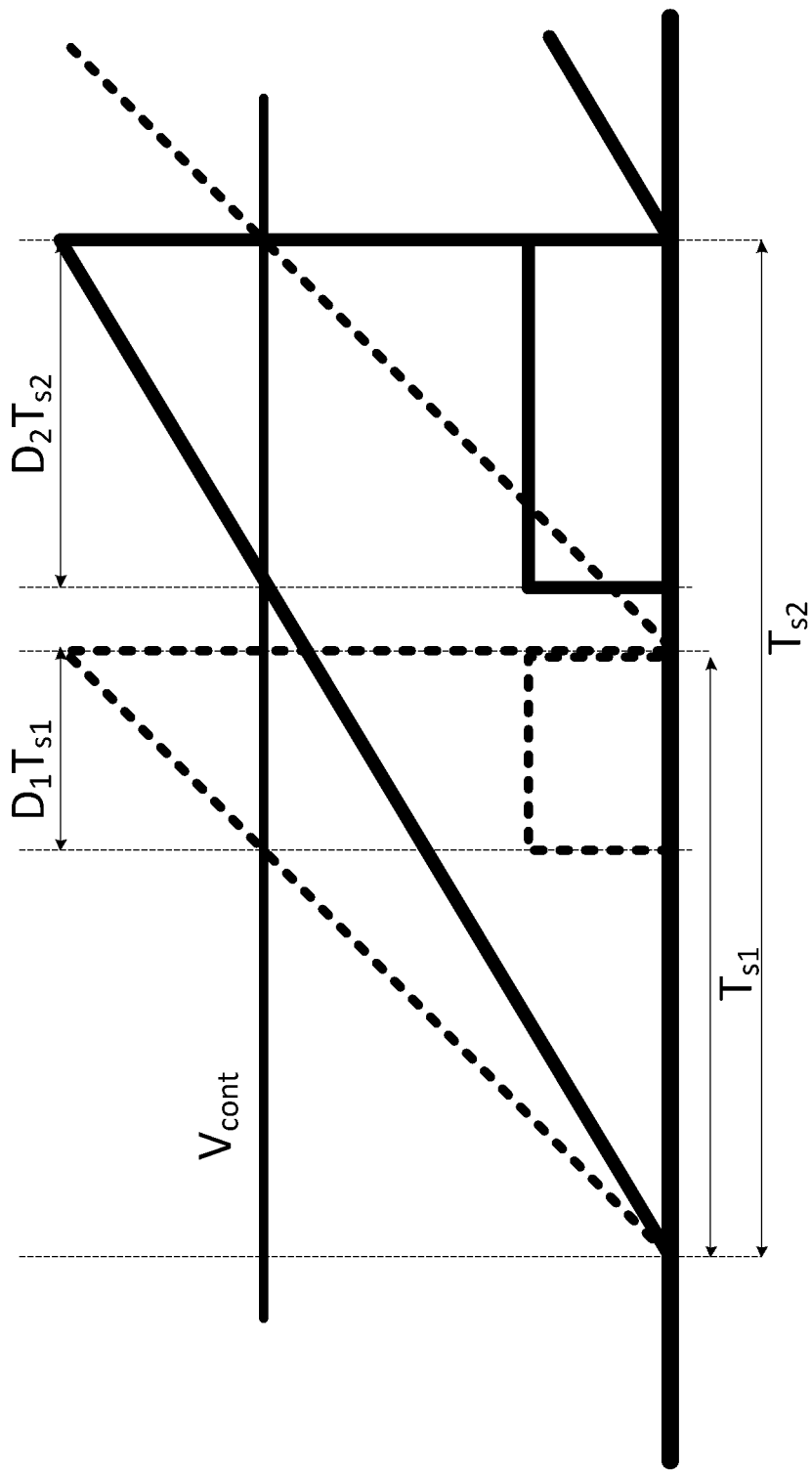
FIG. 9 shows the various pulse width modulation (PWM) pulses for different frequencies.
Figure 10A:
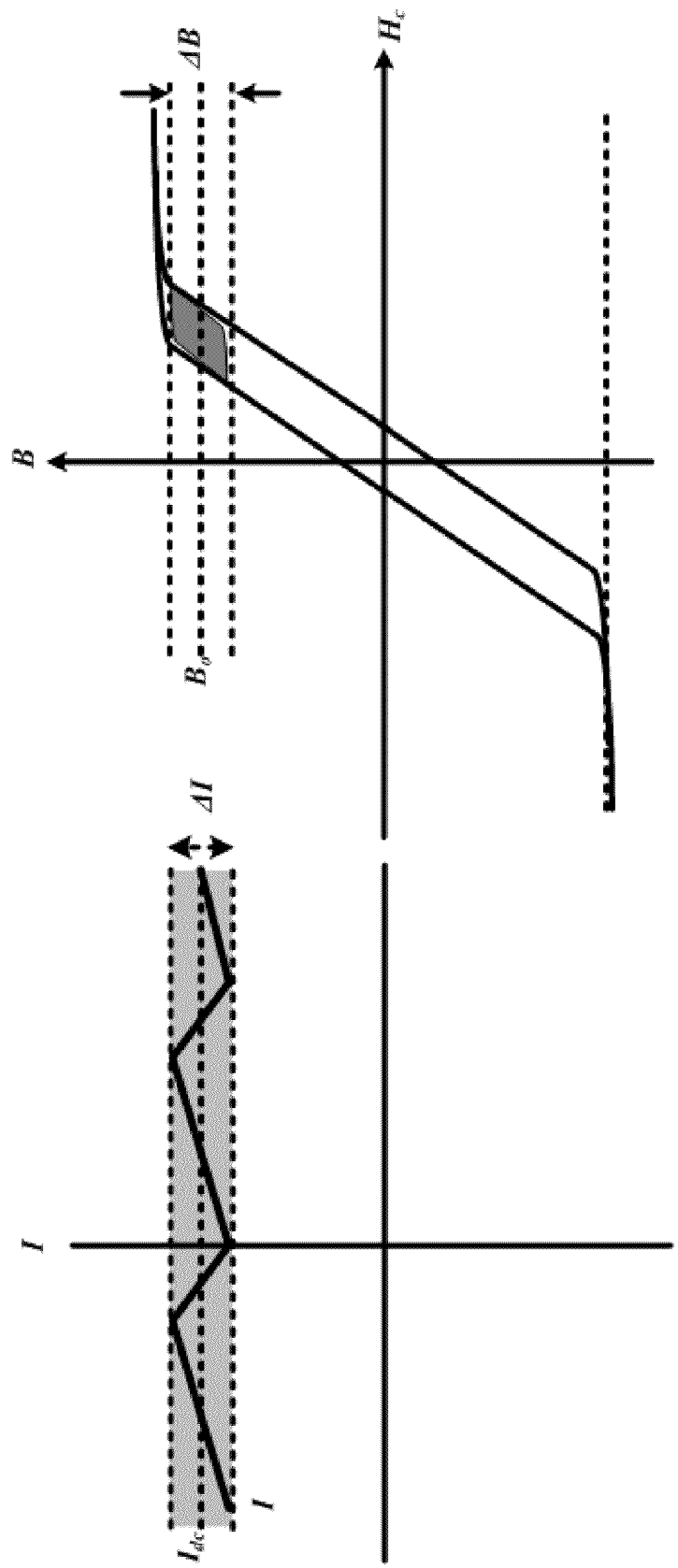
FIG. 10A shows B-H curves of a DC inductor.
Figure 10B:
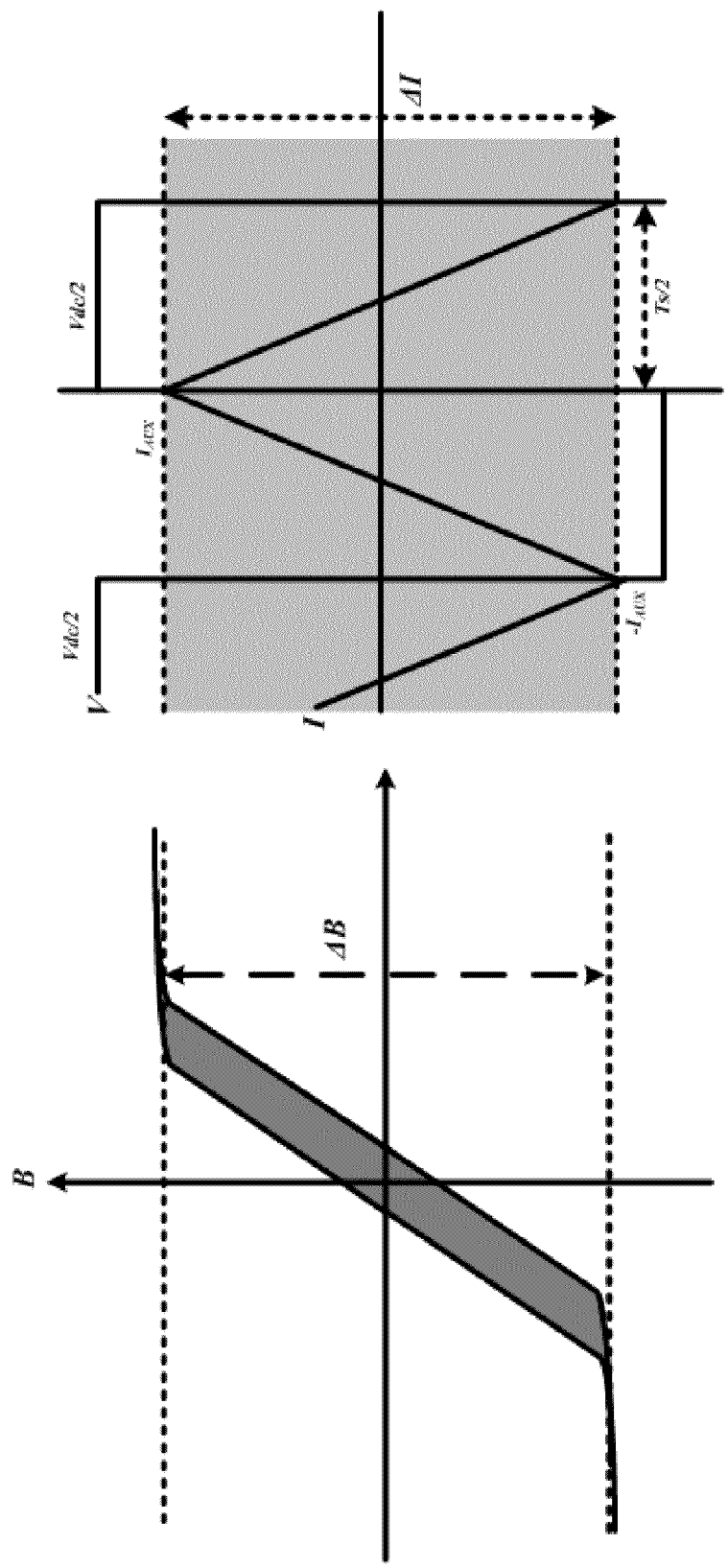
FIG. 10B illustrate B-H curves for an AC inductor.

There are two important points regarding this invention. Firstly, the control system does not impose any compromise on the design of the transformer. This is because at light loads the duty cycle is very small and at heavy loads the duty cycle is large for the battery charger application. Therefore, the volt-second across the transformer for light loads with a lower frequency and smaller duty cycle is almost the same as the volt-second for heavy loads with a higher frequency and larger duty cycle. Secondly, the frequency loop is completely decoupled from the phase-shift loop. FIG. 9 illustrates this fact in that, by changing the frequency of the saw-tooth counter, the duty cycle does not change (i.e., $D_1 = D_2$).

The output voltage and the output current of the converter are controlled through the external voltage loop along with the internal current loop. The internal current loop makes sure that the charging current remains constant and limited during the constant current battery charging process. It limits the duty cycle when the output voltage of the converter is much larger than the battery voltage. As the battery voltage gets close to the output voltage of the converter, the voltage loop determines the duty cycle.

It is worthwhile to note that this variable frequency approach hardly imposes any compromise on the output capacitor design. Since the frequency is adaptive to the load condition (i.e., switching frequency is higher for heavy loads and lower for light loads), the amount of the current ripple remains pretty much constant during the whole range. The output current ripple is given by (Equation 22):

$$\Delta i_{Lo} = \frac{V_{dc} - k \cdot V_o}{k \cdot f_s \cdot L_o} \cdot D \quad (22)$$

Figure 11:
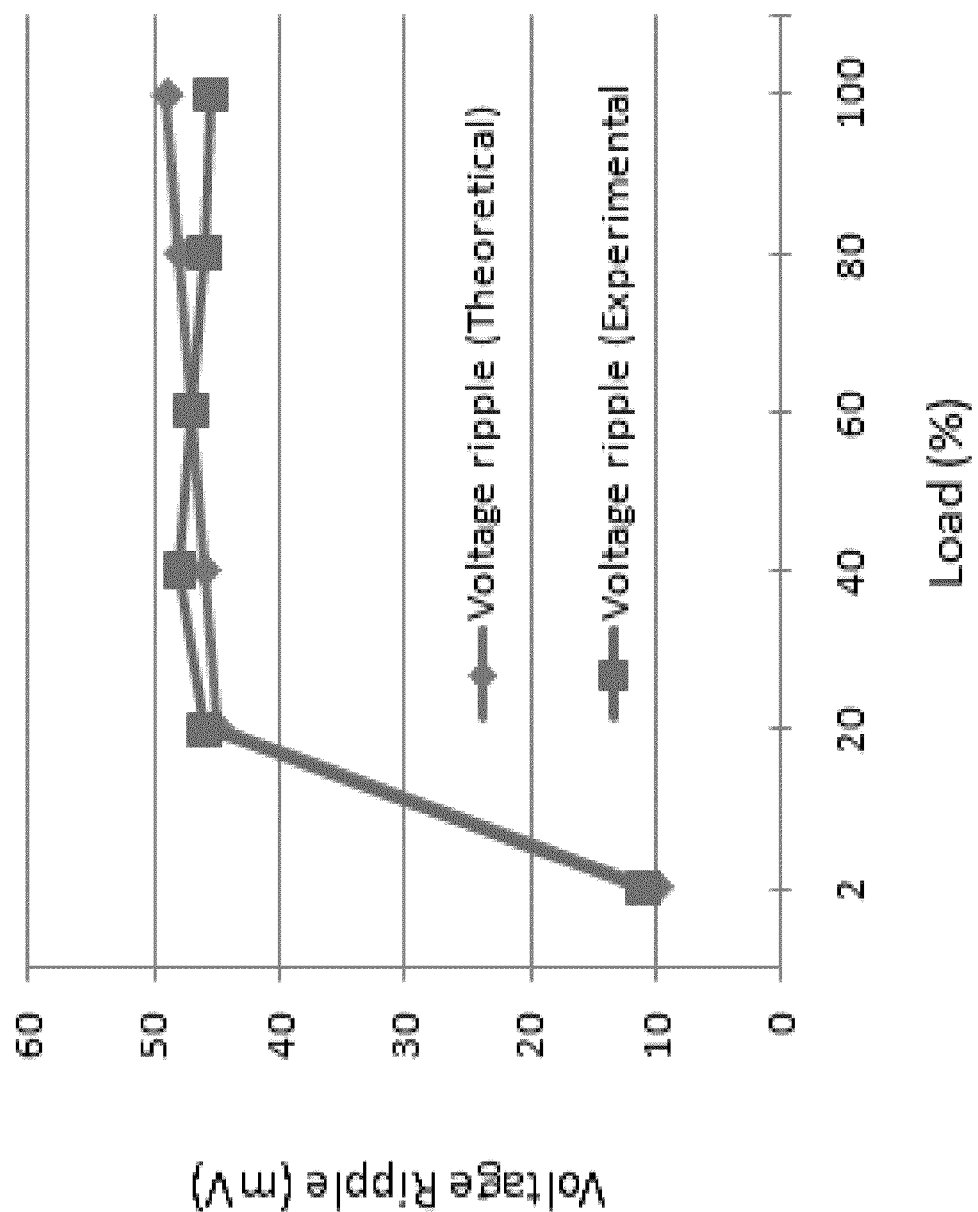
FIG. 11 illustrates the output voltage ripple vs load.

According to this equation, the amount of ripple is proportional to the ratio of $D/f_{sw}$, which means that for light loads, the duty ratio is small and the switching frequency is low, whereas for heavy loads the duty ratio is large and the switching frequency is high. This leads to a mostly constant ripple for the whole range. FIG. 11 shows the theoretical and experimental peak-to-peak values of the output voltage ripple for different load conditions. According to this Figure there are some discrepancies between the theoretical results and the experimental results. Two factors may cause these discrepancies. The first factor is the nonlinear behavior of the output capacitor ESR with respect to the frequency. According to the datasheet of the capacitor used in one implementation, ESR is lower for higher frequencies. The other factor is the loss of duty-ratio for heavy loads. In order to incorporate this effect and make Equation 28 more accurate, the duty cycle should be modified as follows (Equation 29):

$$\Delta i_{Lo} = \frac{V_{dc} - k \cdot V_o}{k \cdot f_s \cdot L_o} \cdot \left(D - \left(\frac{t_\theta - t_\gamma}{T}\right)\right) \quad (23)$$

The effective duty-ratio is almost the same as the theoretical duty-ratio for light loads. However, the effective duty-ratio will be reduced for very heavy load conditions.

In one implementation of the invention, a DSP board (TMX320F28335 eZdSP board from Texas Instruments) is employed. This DSP board is a floating-point DSP, which offers a very flexible environment for advanced calculations. The EPWM channels can be practically used up to 100 KHz. However, for the higher frequency range, the high resolution EPWM should be used to achieve a high resolution PWM signal and to avoid the limit cycle and instability. The high resolution module is embedded in the DSP. Since the range of switching frequency, calculated by Equation 23 and Equation 24 is between 227 KHz to 297 KHz, the high resolution module should be utilized to produce the PWM pulses. Of course, other suitable DSP boards, ASICs, or other I/O and processing means may be used to implement the invention.

Figure 12A:
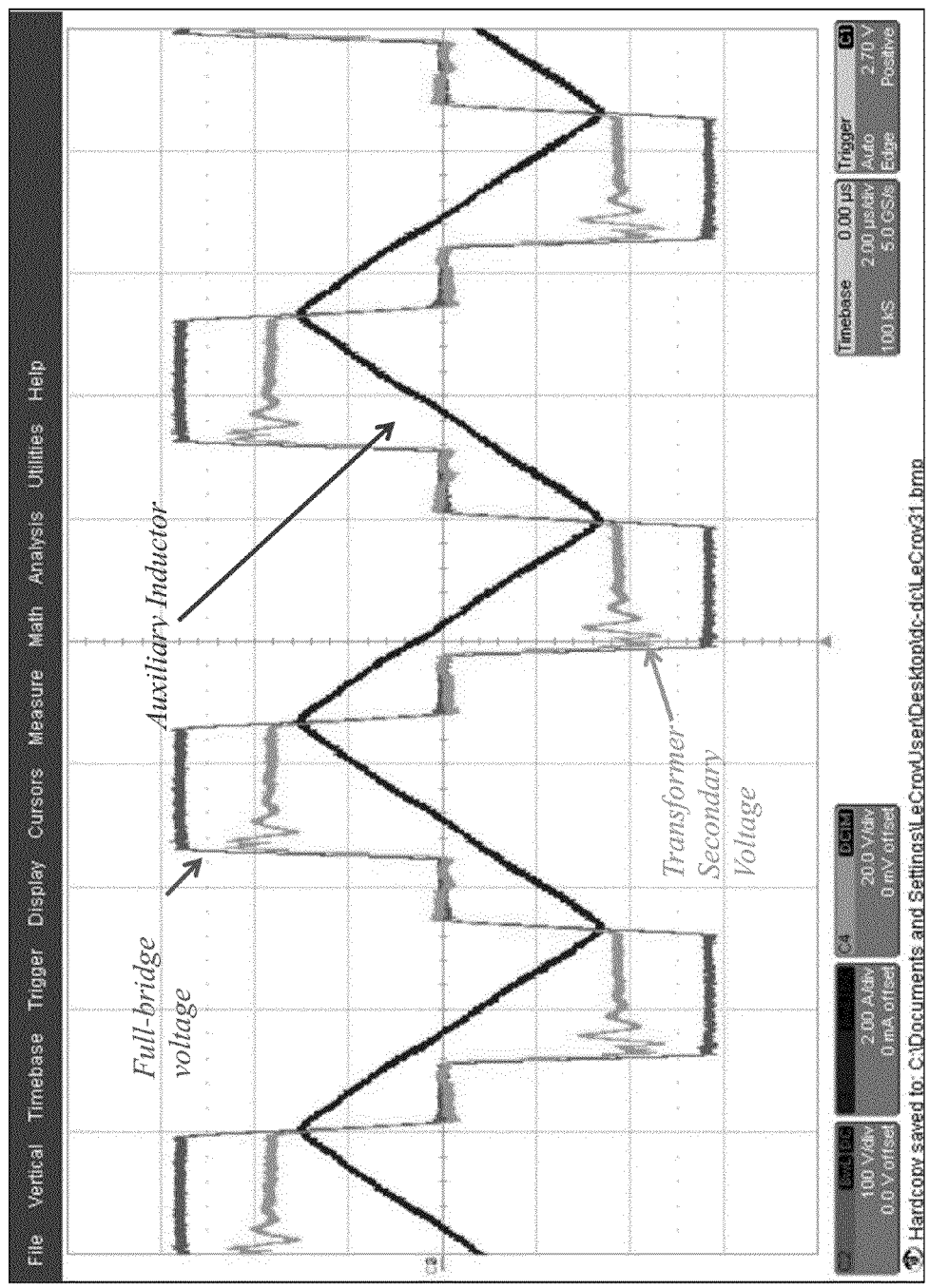
FIG. 12($a$) shows the experimental results of the fixed-frequency phase-shift converter for no-load conditions.
Figure 12B:
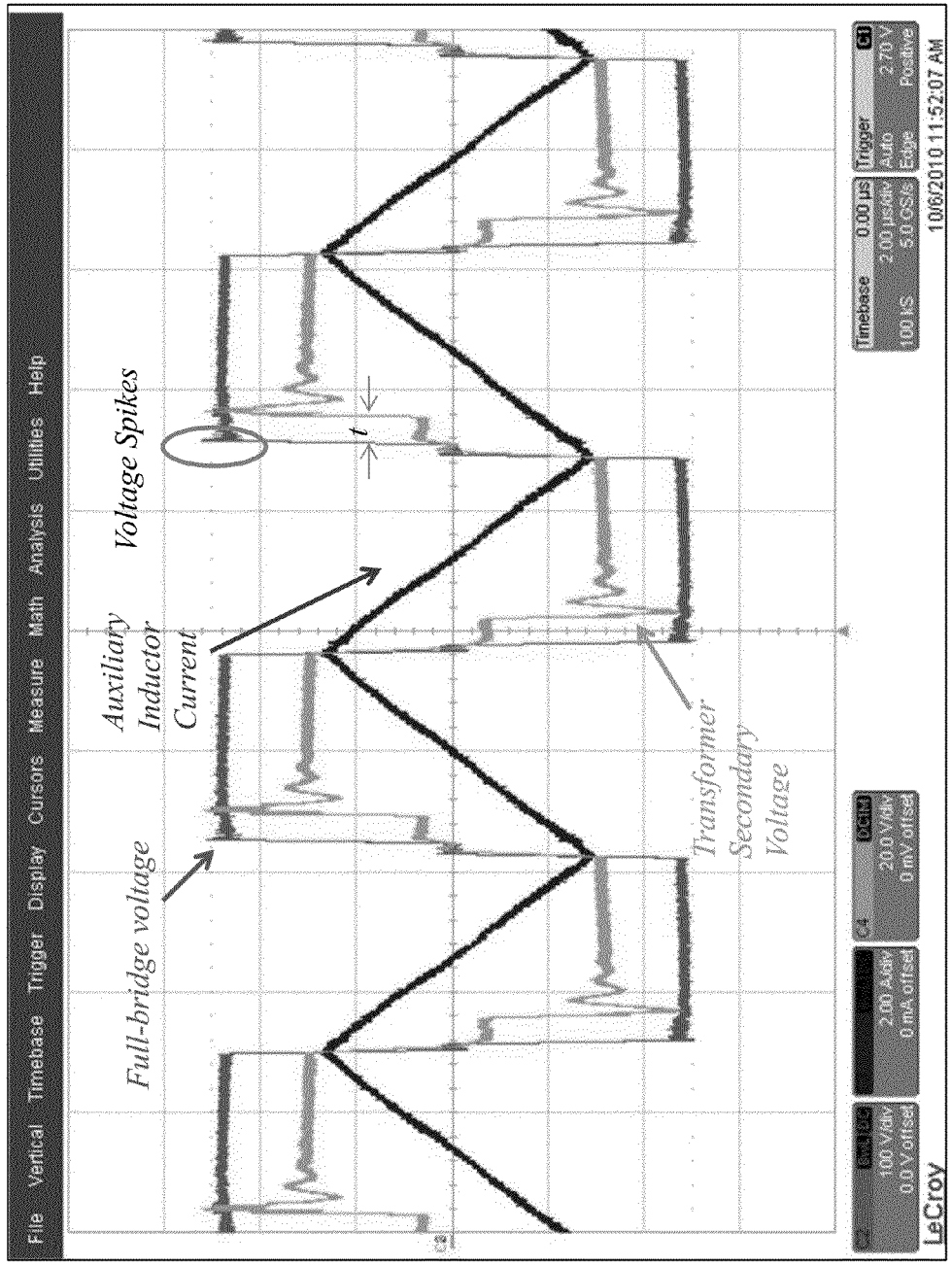

In order to verify the performance of the control method, two programs have been implemented on the DSP board. In the first program, a conventional controller with the fixed switching frequency is implemented. The second program is a controller according to one aspect of the invention. In the former one, a lower switching frequency is required to guarantee the zero voltage switching of the MOSFETs. FIGS. 12(a) and 12(b) show the results for the fixed-frequency method under no-load and full-load conditions. In the no-load condition, the inverter output voltage shows zero voltage switching. However, there is an overshoot in the voltage for the full-load condition. This overshoot is caused by too much inductive current and the delay of the MOSFET body diode turn-on.

Figure 13:
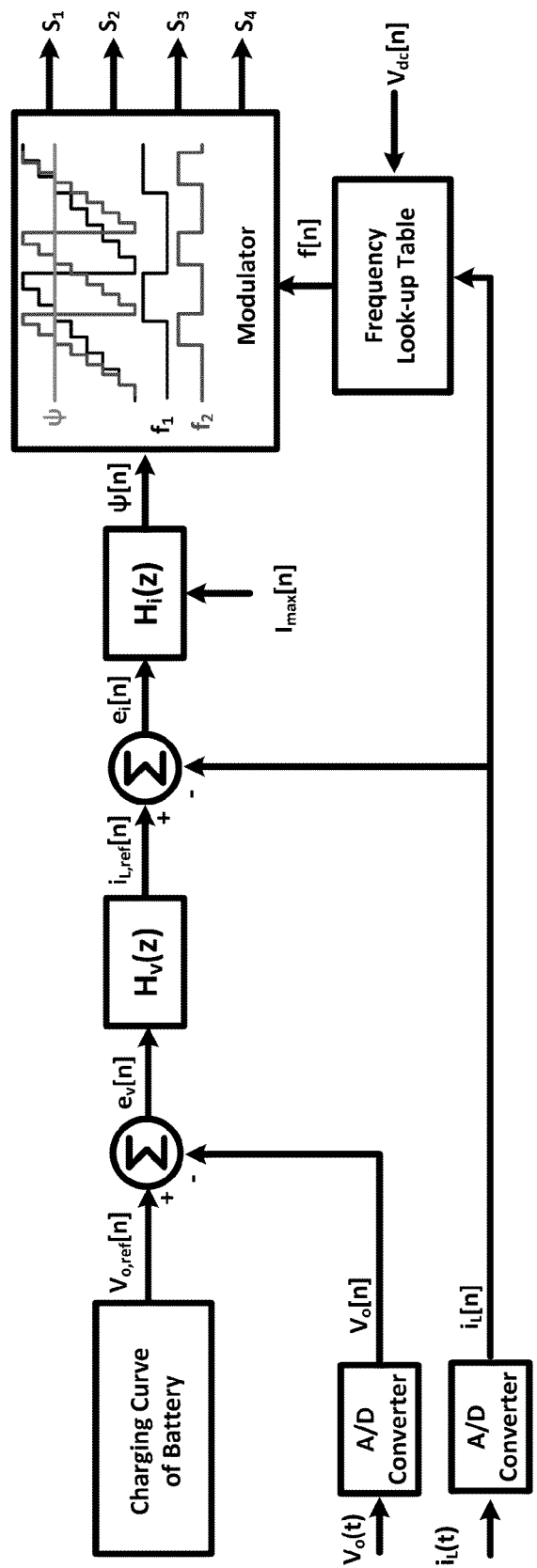
FIG. 13 shows the block diagram of a digitally implemented control system according to one aspect of the invention.

FIG. 13 shows a detailed block diagram of the control technique according to one aspect of the invention. As can be seen in the block diagram, there are two decoupled control loops integrated into the DSP. The first control loop determines the phase-shift angle ($\psi(n)$) and the second loop determines the switching frequency ($f(n)$). The first loop is composed of an external voltage loop plus an internal current loop. The external voltage loop takes the reference value of the output voltage from the charging curve of the battery. This curve is dependent on the battery's characteristics and the impedance between the battery and the converter. The discrete value of the measured voltage comes from the embedded A/D converter on the DSP board. Then, the digital error value is processed by the designed digital controller $H_v(z)$. This controller determines the reference value of the charging current of the battery charger. This value is compared to the measured current and then processed by the current controller, $H_i(z)$. Note that the current controller limits the duty-ratio of the converter during the constant current charging interval. This means that the value of the phase-shift angle (as defined above in Equations 11, 12, and 13) is only determined by the current controller and is limited to a constant value. Finally, the current controller determines the phase shift angle for the phase-shift modulator. The second loop is the frequency loop, which adjusts the frequency of the modulator based on the converter load. In order to implement this loop a simple look-up table (LUT) may be used to adjust the frequency accordingly.

Figure 13A:
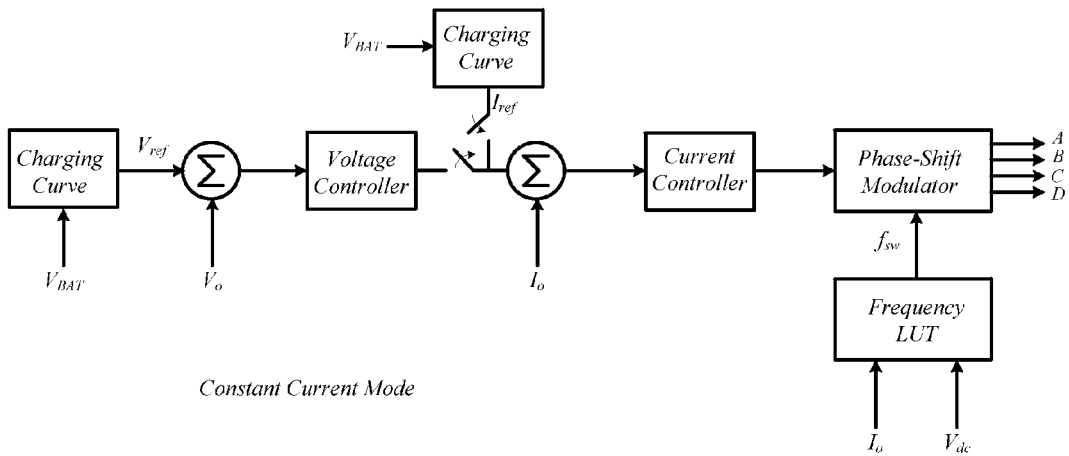
FIG. 13A illustrates different equivalent circuits for the different operating modes of the controller.
Figure 13A:
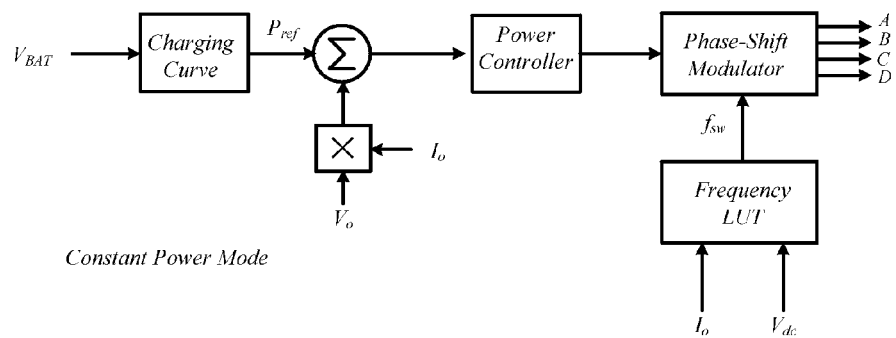
Figure 13A:
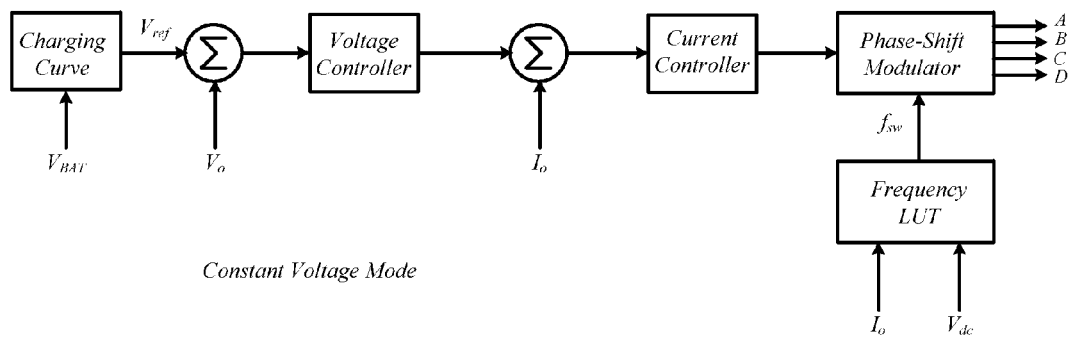
Figure 13B:
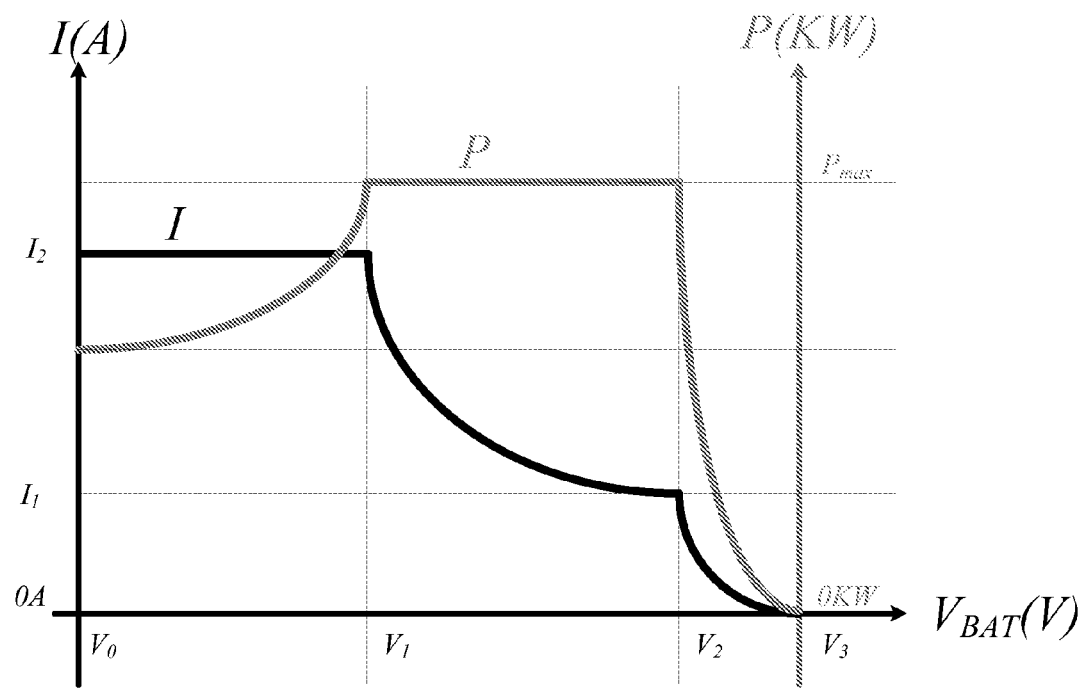
FIG. 13B shows the current-voltage curves for the controller which indicate which operating modes are active and when.

Regarding the reference value of the charging current, this is determined based on the operating mode of the controller. There are three modes of operations: the first operating mode uses constant current. In this mode, the current loop determines the phase-shift such that the output current of the converter is constant. As such, for the first mode, the reference value is fixed due to the constant current. The second mode is the constant power mode. In this mode, the voltage and current control loops determine the phase-shift such that the output power is constant. For this mode, the reference value is the reference power. The last mode is the constant voltage mode. In this mode the voltage loop determines the phase shift in order to keep the output voltage constant. FIG. 13A illustrates the different equivalent circuits for the different operating modes of the controller. FIG. 13B shows the current-voltage curves for the controller illustrating the different operating modes.

Figure 14A:
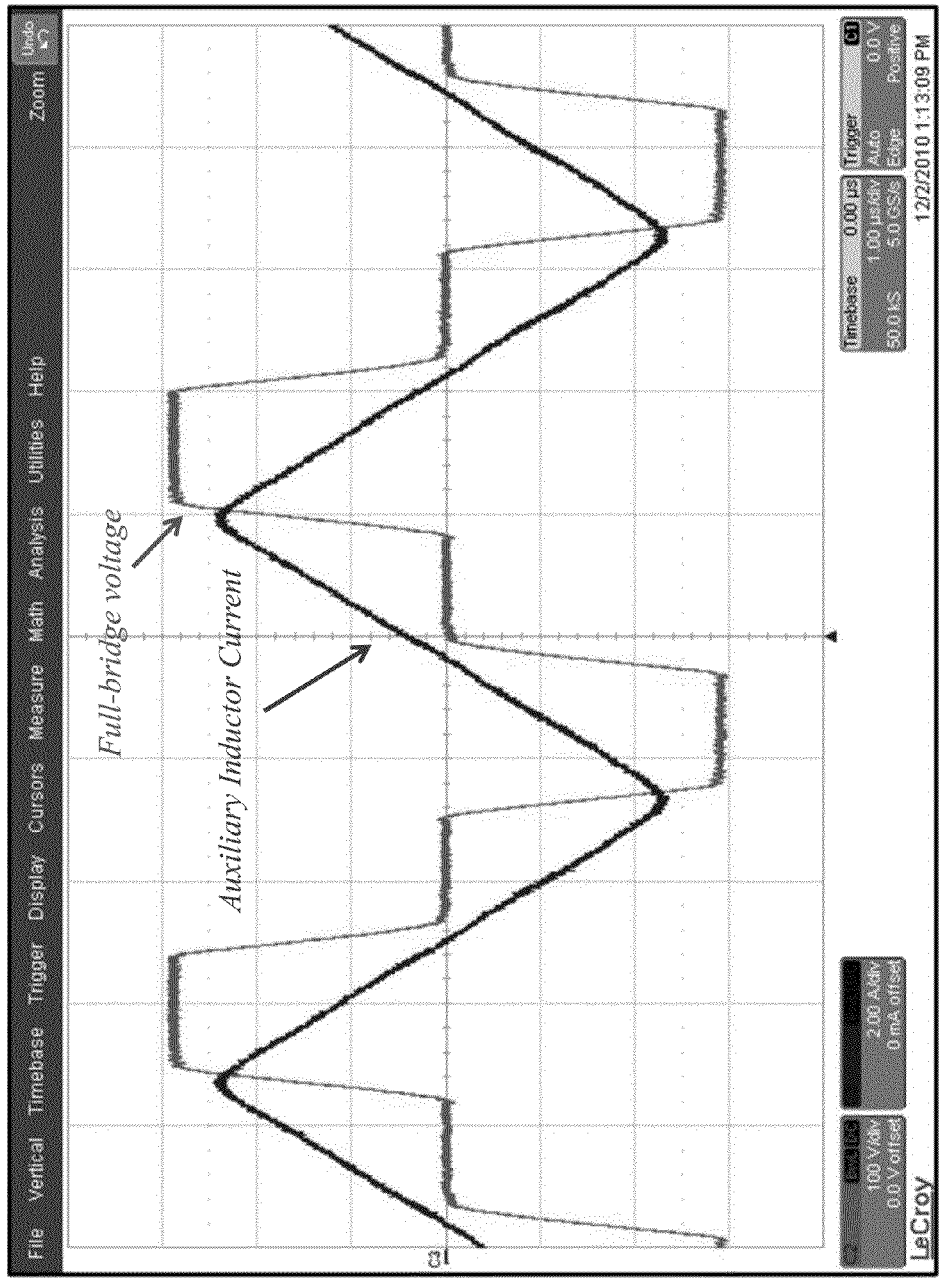
FIGS. 14($a$), 14($b$), and 14($c$) show the experimental results of the phase-shift converter for no-load conditions.
Figure 14B:
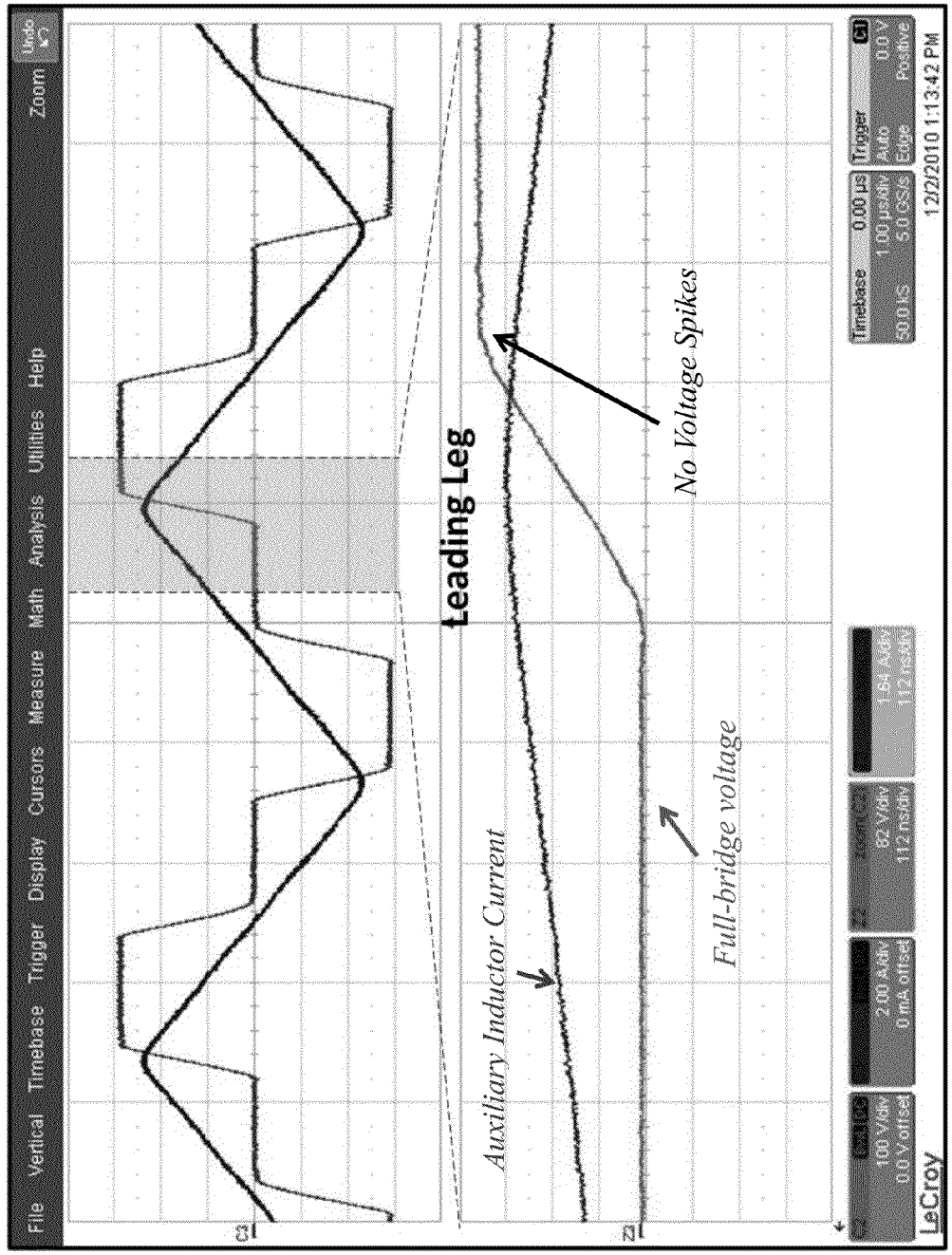
Figure 14C:
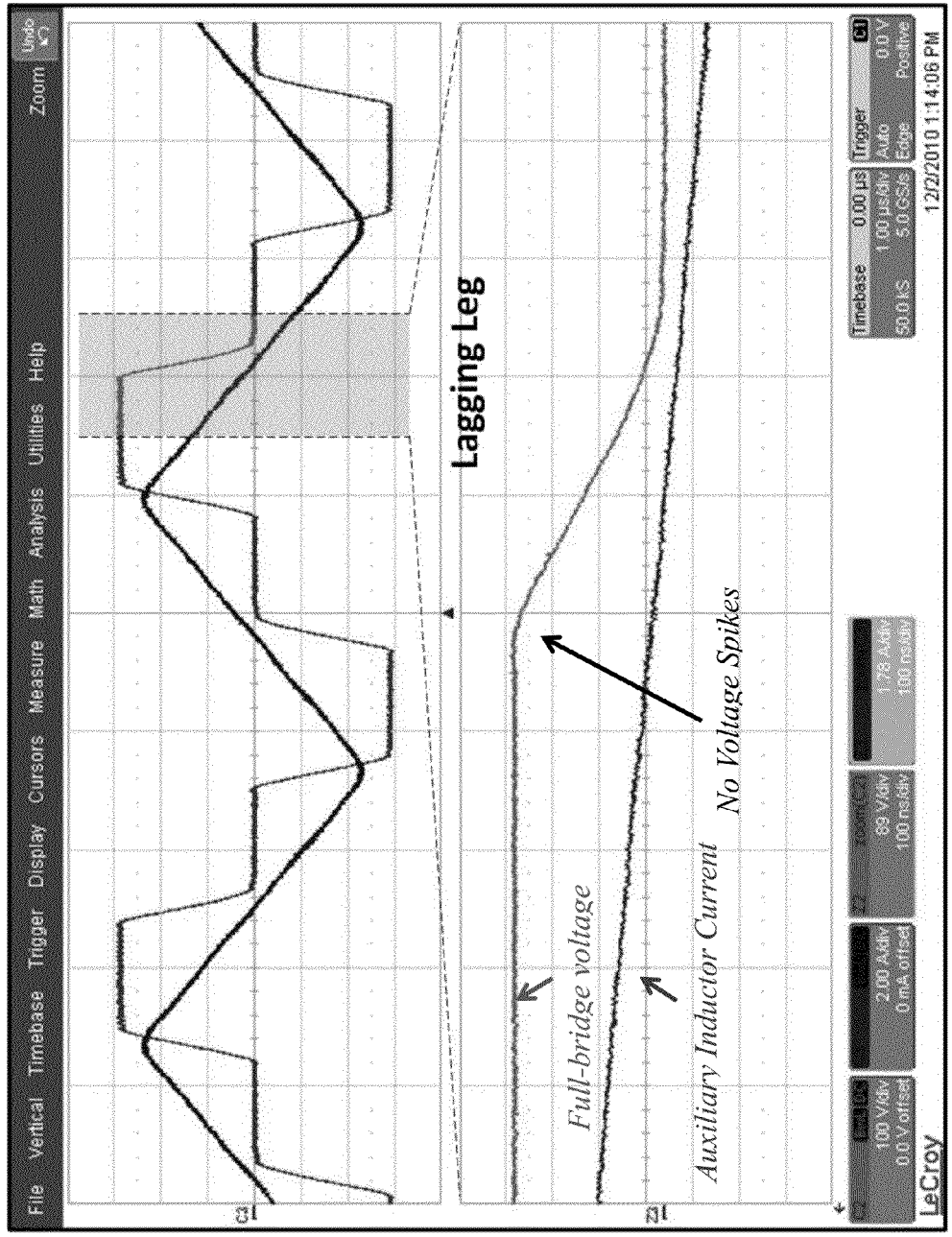

FIGS. 14(a), 14(b), and 14(c) illustrate the experimental results for no-load conditions for the controller according to one aspect of the invention. The peak value of the auxiliary circuit current and the output voltage of the inverter are shown in FIG. 14(a). Under no-load conditions, the peak value of the auxiliary circuit current is at the maximum value and the switching frequency is at the minimum value.

Figure 15A:
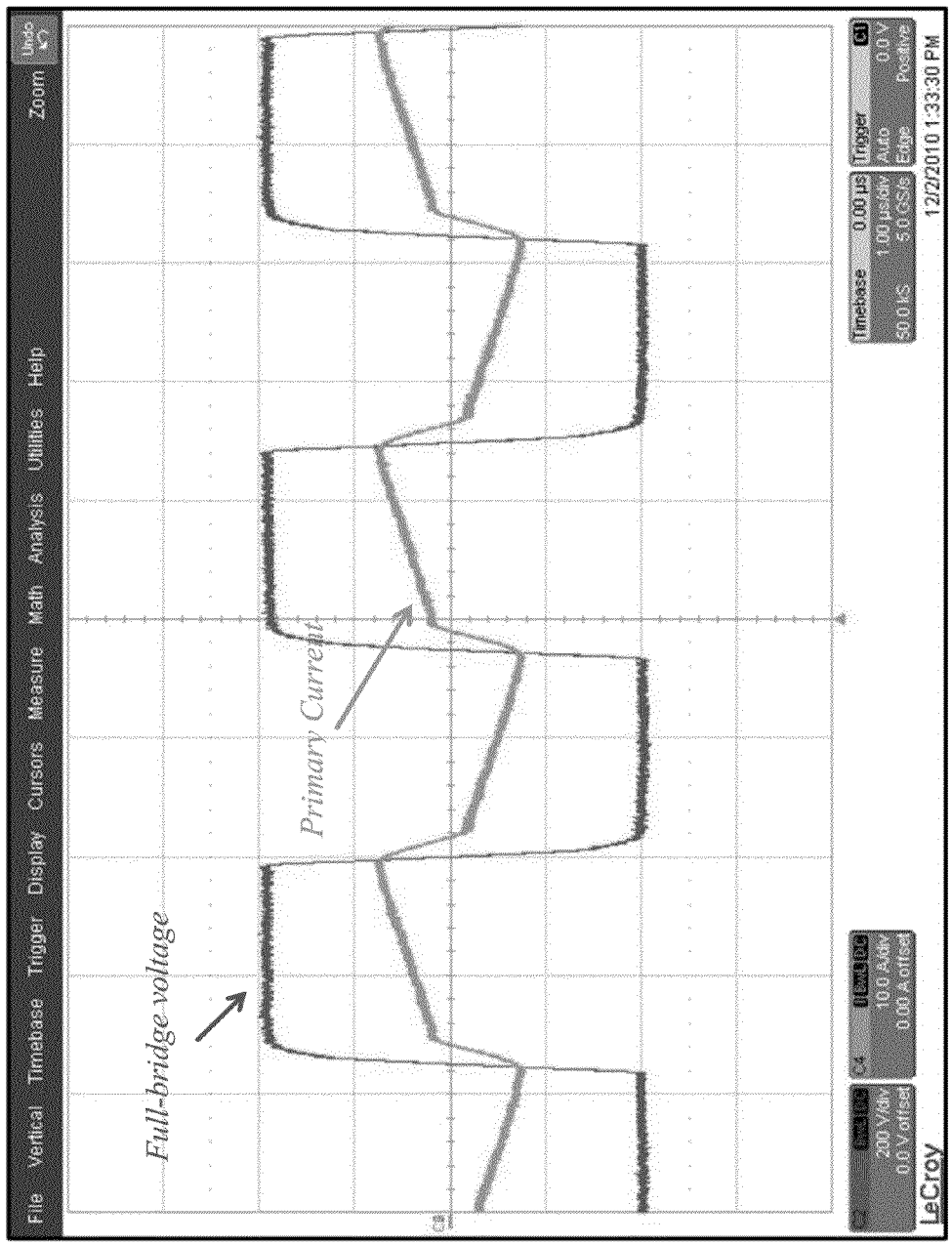
FIGS. 15($a$), 15($b$), and 15($c$) show the experimental results of the phase-shift converter for full-load conditions.
Figure 15B:
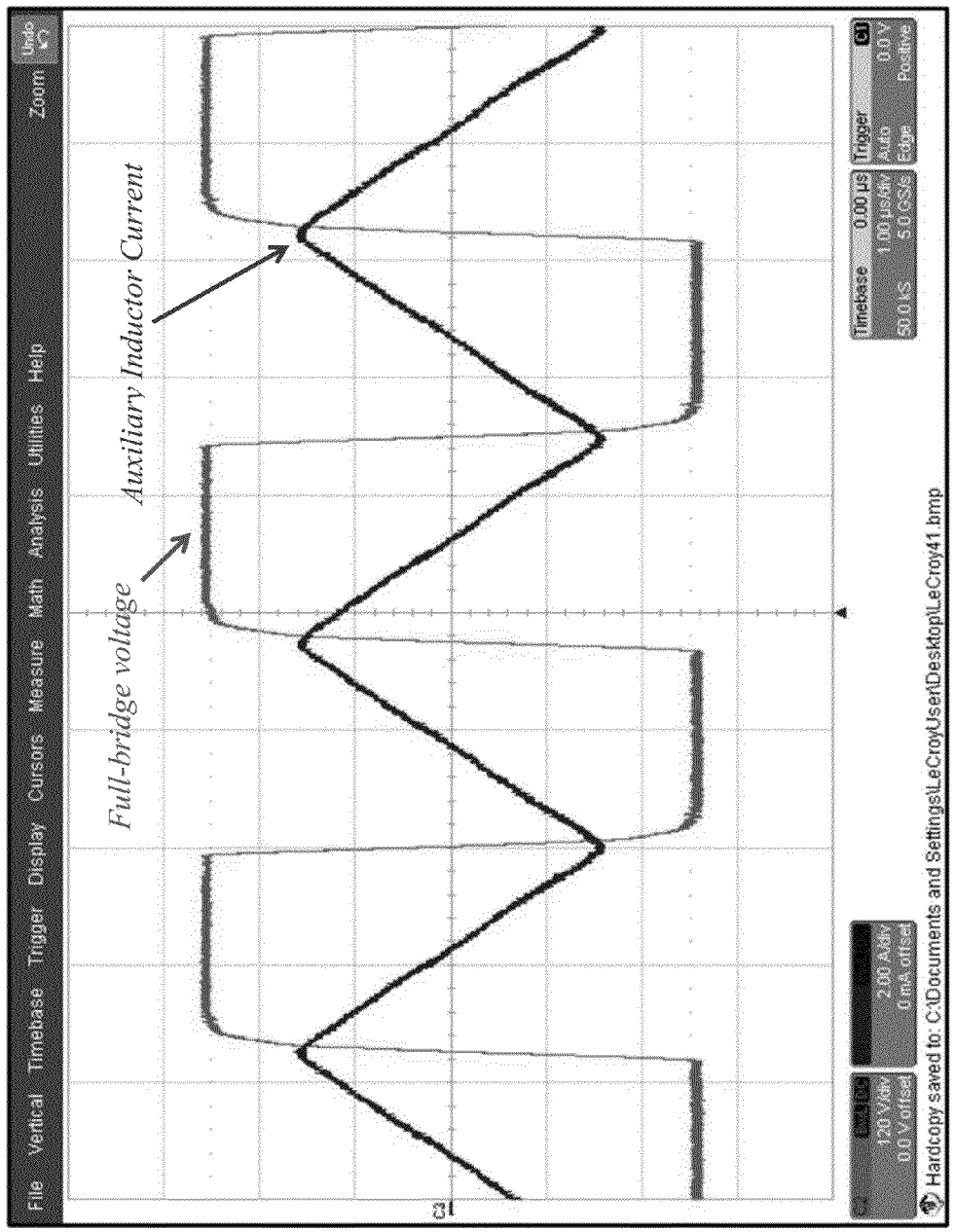
Figure 15C:
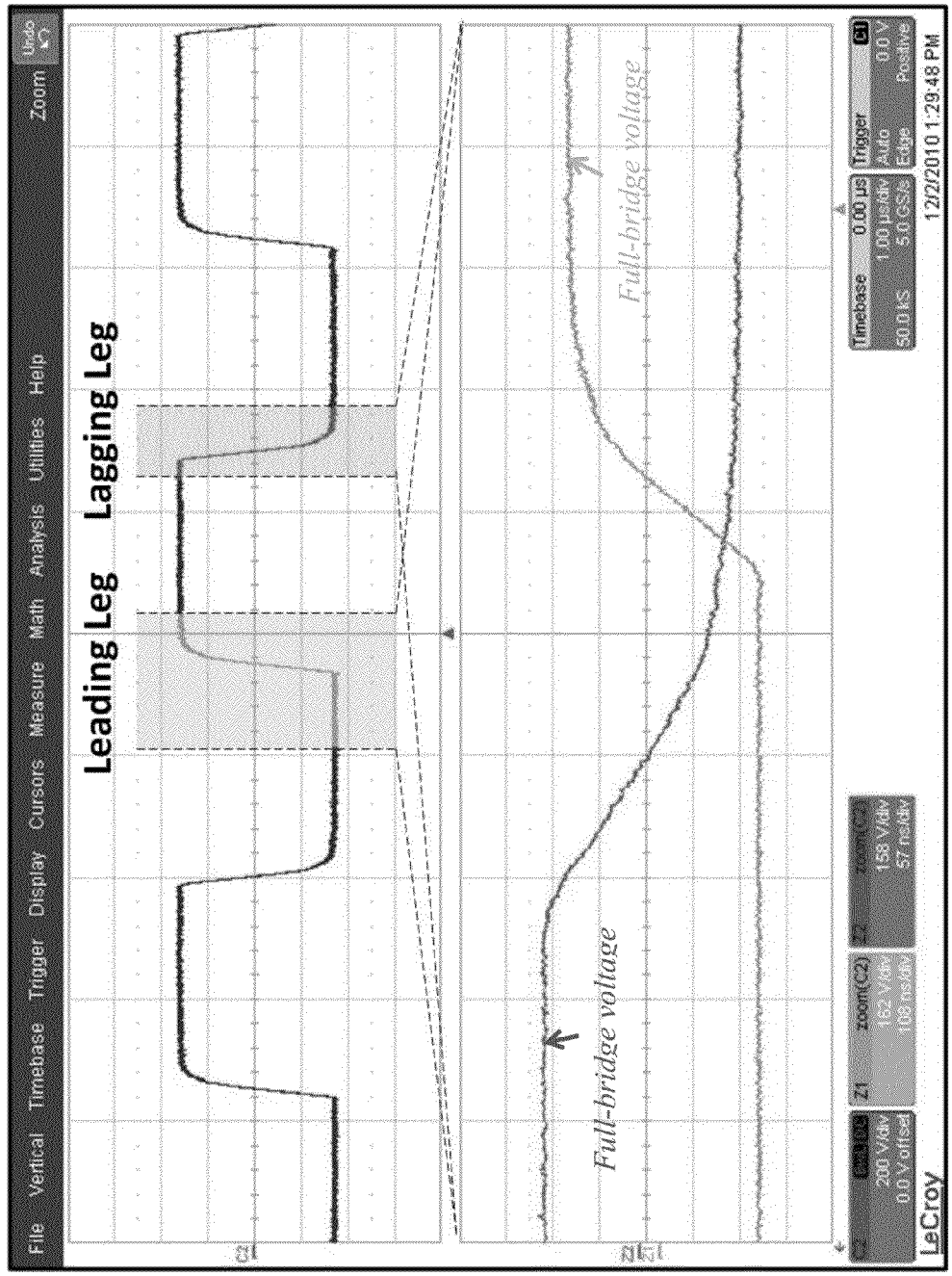

FIGS. 15(a), 15(b), and 15(c) illustrate the experimental results for the proposed controller at no-load conditions. FIG. 15(c) depicts that there is no overshoot in the voltage due to the fact that there is just enough inductive current for ZVS compared to FIG. 12(b) where there is too much inductive current for the fixed frequency controller.

Figure 16:
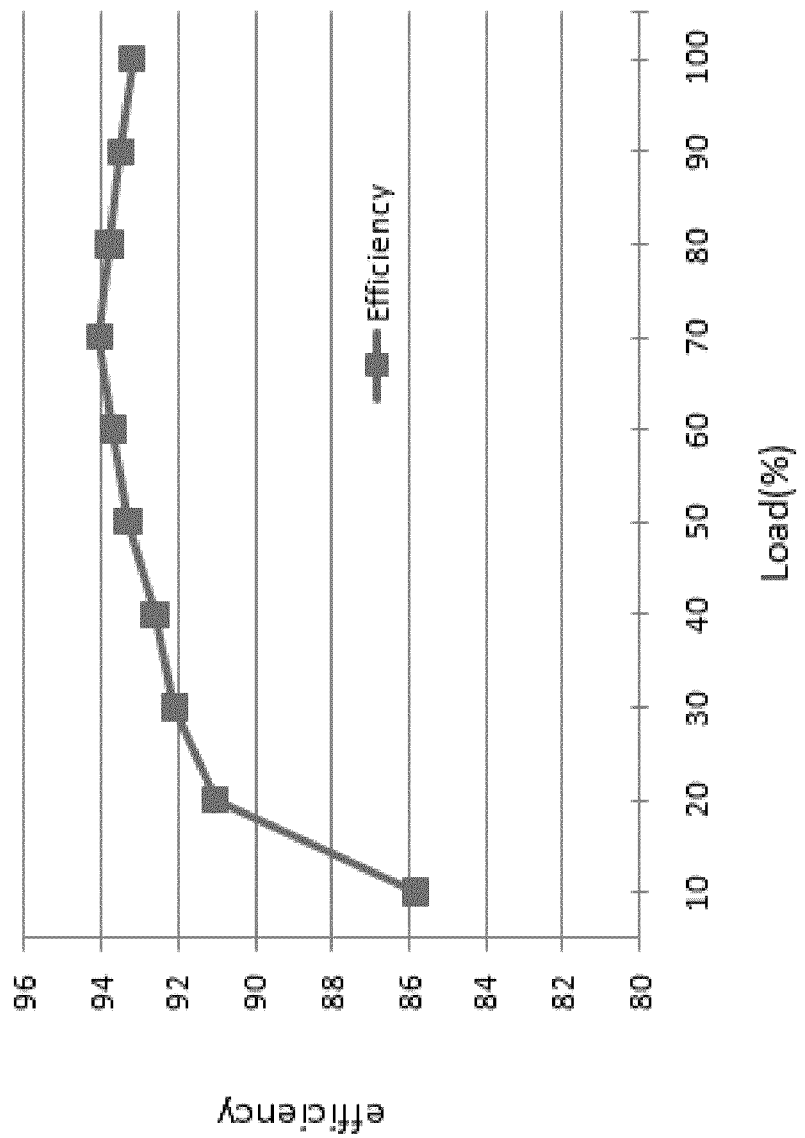
FIG. 16 shows the efficiency curve of the converter.
Figure 17:
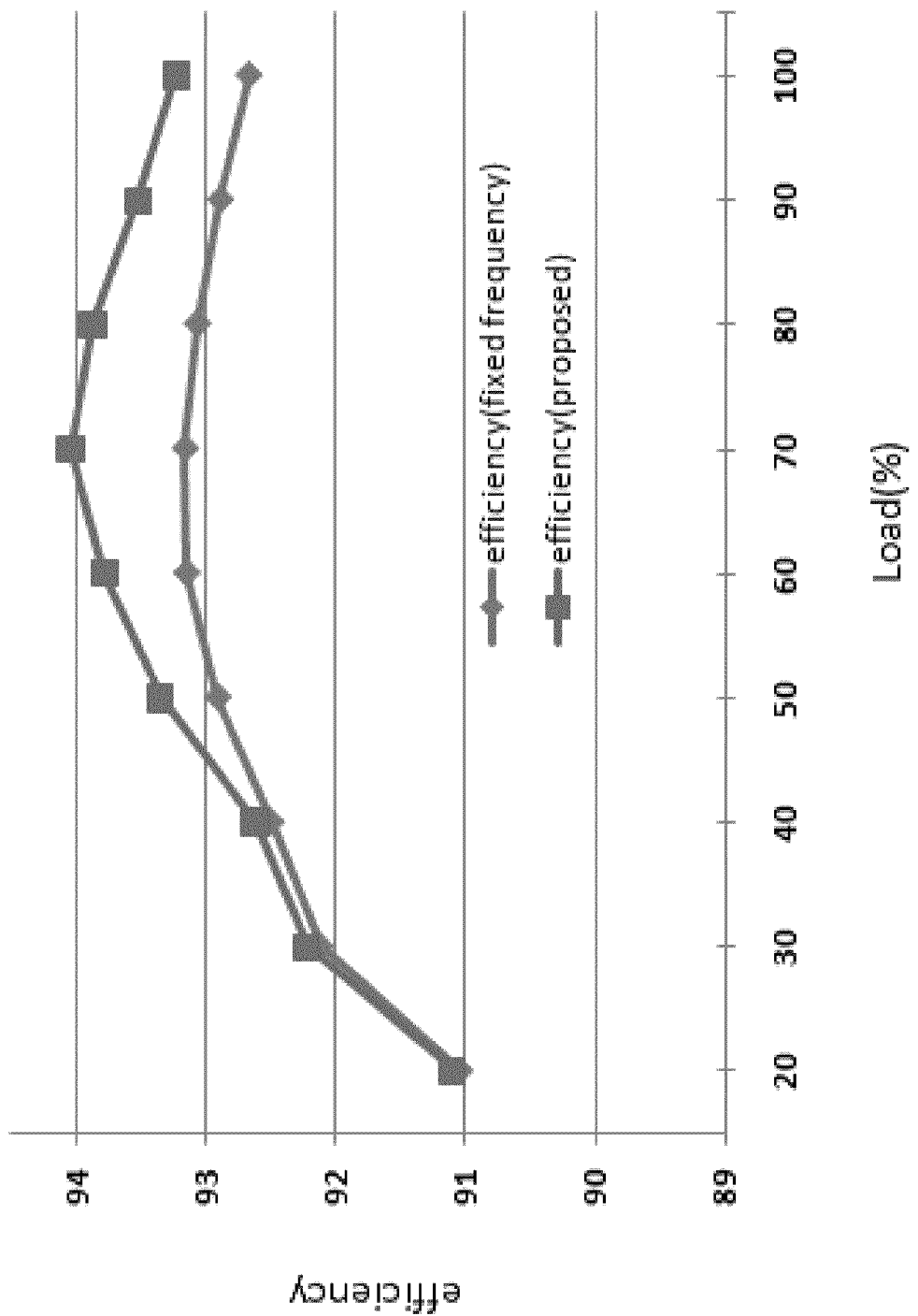
FIG. 17 is the efficiency comparison of the proposed converter and the conventional converter.

FIG. 16 shows the efficiency curve of the invention. This figure shows that the efficiency is quite flat. FIG. 17 illustrates a comparison between the efficiency of the fixed-frequency control method and the control method according to one aspect of the invention. This figure shows that the efficiency of the proposed converter is very similar to that for the fixed frequency controller for light loads, but the efficiency is higher for heavy loads. The control method according to one aspect of the invention shows a very good efficiency when compared to the fixed frequency methods since the amount of auxiliary inductor energy is optimized according to the load condition. Because the amount of energy is not sufficient to maintain ZVS at light loads, the auxiliary energy is higher. For heavy loads, the energy is sufficient to have the converter operate under ZVS, and the auxiliary circuit energy is reduced by the frequency loop. In addition, the disclosed control method does not increase any extra burden on the DSP since, in the implementation discussed above, the frequency loop is implemented by a simple look-up table. Therefore, the controller according to one aspect of the invention hardly imposes any extra complexity compared to the conventional controller.

It should be noted that while MOSFETs are used in the converter, other types of transistors may be used. However, MOSFETs are the preferred transistors for this invention as zero voltage switching is more critical and useful to MOSFETs than for other transistors. Also, while the MOSFETs in the converter described above are disclosed as having a separate snubber capacitor, such separate snubber capacitors are preferred but not necessary. The internal capacitance of each MOSFET can serve as the snubber capacitor. However, an external and separate snubber capacitor reduces turn off losses and linearizes the capacitance seen from the output of the transistor bridge.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

A person understanding this invention may now conceive of alternative structures and embodiments or variations of the above all of which are intended to fall within the scope of the invention as defined in the claims that follow.

We claim:
1. A DC-to-DC full bridge converter circuit comprising:
    a leading leg comprising:
        a first transistor;
        a second transistor;
    a lagging leg comprising:
        a third transistor;
        a fourth transistor;
    a first auxiliary circuit comprising:
        a first capacitor coupled between a first node and a second node;
        a second capacitor coupled between said second node and a third node;
        a first auxiliary inductor coupled between said second node and a fourth node;
    a second auxiliary circuit comprising:
        a third capacitor coupled between said first node and a fifth node;
        a fourth capacitor coupled between said third node and said fifth node;
        a second auxiliary inductor coupled between said fifth node and a sixth node;
    wherein
        said first node is coupled to a drain of said first transistor and a drain of said third transistor;
        said third node is coupled to a source of said second transistor and a source of said fourth transistor;
        said fourth node is coupled to a source of said first transistor and a drain of said second transistor;
        said sixth node is coupled to a source of said third transistor and a drain of said fourth transistor;
    wherein said first auxiliary inductor has an inductance according to the formula:

$$L_{AUX1} = \frac{V_{dc} \cdot t_d}{16 f_s \cdot C_{s1} \cdot (V_{dc} + V_Z)}$$

where
    $f_s$ is a switching frequency for said converter;
    $C_{s1}$ is a snubber capacitance for said first transistor;
    $t_d$ is a transition time between said first transistor being switched off and said second transistor being switched on;
    $V_Z$ is a voltage across said first transistor at an end of said transition time; and
    $V_{dc}$ is an input voltage of the converter.

2. The DC-to-DC full bridge converter circuit according to claim 1 wherein said second auxiliary inductor has an inductance according to the formula:

$$L_{AUX2} = \frac{1}{128 f_s^2 \cdot C_{s2}}$$

where
    $f_s$ is a switching frequency for said converter; and
    $C_{s2}$ is a snubber capacitance for said third transistor.

3. The DC-to-DC full bridge converter circuit according to claim 1 wherein a switching frequency for said circuit is based on a load of said circuit.

4. The DC-to-DC full bridge converter circuit according to claim 3 wherein said switching frequency is adjusted to control an inductive current in said circuit to ensure proper conditions for zero voltage switching.

5. The DC-to-DC full bridge converter circuit according to claim 1 wherein said circuit is controlled by a method comprising:
    a) determining a current difference between a reference current for said converter circuit and an output current for said converter circuit;
    b) determining a phase shift between switching pulses for said first transistor in said leading leg of said converter circuit and for said third transistor in said lagging leg of said converter circuit based on said current difference;
    c) determining a load on said converter;
    d) determining a switching frequency for said converter circuit based on said load;
    e) adjusting and modulating a switching of said transistors of said converter circuit based on said phase shift and said switching frequency.

6. The DC-to-DC full bridge converter circuit according to claim 5 wherein said reference current is derived from a difference between a reference voltage and an output voltage from said converter circuit.

7. A DC-to-DC full bridge converter circuit comprising:
    a leading leg comprising:
        a first transistor;
        a second transistor;
    a lagging leg comprising:
        a third transistor;
        a fourth transistor;

a first auxiliary circuit comprising:
  a first capacitor coupled between a first node and a second node;
  a second capacitor coupled between said second node and a third node;
  a first auxiliary inductor coupled between said second node and a fourth node;
a second auxiliary circuit comprising:
  a third capacitor coupled between said first node and a fifth node;
  a fourth capacitor coupled between said third node and said fifth node;
  a second auxiliary inductor coupled between said fifth node and a sixth node;
wherein
  said first node is coupled to a drain of said first transistor and a drain of said third transistor;
  said third node is coupled to a source of said second transistor and a source of said fourth transistor;
  said fourth node is coupled to a source of said first transistor and a drain of said second transistor;
  said sixth node is coupled to a source of said third transistor and a drain of said fourth transistor;
wherein said second auxiliary inductor has an inductance according to the formula:

$$L_{AUX2} = \frac{1}{128 f_s^2 \cdot C_{s2}}$$

where
  $f_s$ is a switching frequency for said converter; and
  $C_{s2}$ is a snubber capacitance for said third transistor.

8. The DC-to-DC full bridge converter circuit according to claim 7 wherein a switching frequency for said circuit is based on a load of said circuit.

9. The DC-to-DC full bridge converter circuit according to claim 8 wherein said switching frequency is adjusted to control an inductive current in said circuit to ensure proper conditions for zero voltage switching.

10. The DC-to-DC full bridge converter circuit according to claim 7 wherein said circuit is controlled by a method comprising:
  a) determining a current difference between a reference current for said converter circuit and an output current for said converter circuit;
  b) determining a phase shift between switching pulses for said first transistor in said leading leg of said converter circuit and for said third transistor in said lagging leg of said converter circuit based on said current difference;
  c) determining a load on said converter;
  d) determining a switching frequency for said converter circuit based on said load;
  e) adjusting and modulating a switching of said transistors of said converter circuit based on said phase shift and said switching frequency.

11. The DC-to-DC full bridge converter circuit according to claim 10 wherein said reference current is derived from a difference between a reference voltage and an output voltage from said converter circuit.

* * * * *